US011290166B2

(12) United States Patent
Kim et al.

(10) Patent No.: US 11,290,166 B2
(45) Date of Patent: Mar. 29, 2022

(54) ELECTRONIC DEVICE FOR CONTROLLING BEAM BASED ON DATA OBTAINED BY CAMERA AND METHOD FOR THE SAME

(71) Applicant: Samsung Electronics Co., Ltd., Suwon-si (KR)

(72) Inventors: Minjeong Kim, Suwon-si (KR); Hojong Kim, Suwon-si (KR); Jaeyoung Huh, Suwon-si (KR); Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/800,549

(22) Filed: Feb. 25, 2020

(65) Prior Publication Data

US 2020/0322016 A1 Oct. 8, 2020

(30) Foreign Application Priority Data

Apr. 2, 2019 (KR) .................. 10-2019-0038506

(51) Int. Cl.
*H04B 7/00* (2006.01)
*H04B 7/06* (2006.01)
*H04B 7/0408* (2017.01)
*H04B 17/27* (2015.01)
*H04W 16/28* (2009.01)
(Continued)

(52) U.S. Cl.
CPC .......... *H04B 7/0617* (2013.01); *H01Q 1/243* (2013.01); *H01Q 21/28* (2013.01); *H04B 7/0408* (2013.01); *H04B 7/0695* (2013.01); *H04B 17/27* (2015.01); *H04W 16/28* (2013.01)

(58) Field of Classification Search
CPC .. H04B 7/0617; H04B 7/0408; H04B 7/0695; H04B 17/27; H01Q 1/243; H01Q 21/28; H04W 16/28
See application file for complete search history.

(56) References Cited

U.S. PATENT DOCUMENTS 10,211,903 B1\* 2/2019 Lee ...................... H04B 5/0056
2015/0195026 A1\* 7/2015 Sagong ................ H04B 7/0695
375/267
(Continued)

FOREIGN PATENT DOCUMENTS

CN 103281711 A 9/2013
KR 10-2009-0012287 A 2/2009
(Continued)

OTHER PUBLICATIONS

International Search Report dated Mar. 3, 2020, issued in International Application No. PCT/KR2019/016227.

*Primary Examiner* — Khai M Nguyen
(74) *Attorney, Agent, or Firm* — Jefferson IP Law, LLP

(57) ABSTRACT

An electronic device and an operation method of an electronic device are provided. The electronic device includes at least one mmWave antenna module configured to include a plurality of antennas, a camera capable of measuring a distance between an external object and the electronic device, a communication processor configured to be operationally connected to the at least one mmWave antenna module, and an application processor configured to be operationally connected to the camera and the communication processor.

20 Claims, 14 Drawing Sheets

(51) Int. Cl.
*H01Q 1/24* (2006.01)
*H01Q 21/28* (2006.01)

(56) References Cited

U.S. PATENT DOCUMENTS

| | | |
|---|---|---|
| 2017/0111806 A1 | 4/2017 | Roh et al. |
| 2018/0284217 A1 | 10/2018 | Takeuchi |
| 2018/0323834 A1* | 11/2018 | Jiang .......................... G01S 3/40 |
| 2019/0154813 A1 | 5/2019 | Lee et al. |
| 2020/0044314 A1* | 2/2020 | Xia ........................... H01Q 1/38 |

FOREIGN PATENT DOCUMENTS

| | | |
|---|---|---|
| KR | 10-2015-0081610 A | 7/2015 |
| KR | 10-2017-0044994 A | 4/2017 |
| KR | 10-1909252 B1 | 10/2018 |

* cited by examiner

700

701

| #1 | #9 | | | ... | | | |
|----|-----|--|--|-----|--|--|--|
| #2 | #10 | | | ... | | | |
| | | | | | | | |
|  | : | | | | | | |
| | | | | | | | |
| | | | | | | | |
| | | | | | | | |
| #8 | #16 | | | | | | |

ELECTRONIC DEVICE FOR CONTROLLING BEAM BASED ON DATA OBTAINED BY CAMERA AND METHOD FOR THE SAME

CROSS-REFERENCE TO RELATED APPLICATION(S)

This application is based on and claims priority under 35 U.S.C. § 119(a) of a Korean patent application number 10-2019-0038506, filed on Apr. 2, 2019, in the Korean Intellectual Property Office, the disclosure of which is incorporated by reference herein in its entirety.

BACKGROUND

1. Field

The disclosure relates to an electronic device and an operation method of an electronic device. More particularly, the disclosure relates to a technology for controlling a beam, based on data obtained by a camera and a method for the same.

2. Description of Related Art

With the spread of various electronic devices such as smart phones, tablet personal computers (PCs), portable multimedia players (PMPs), personal digital assistants (PDAs), laptop personal computers (PCs), and wearable devices, various wireless communication technologies, which are used to perform communication of various electronic devices, have been developed.

Recently, among the wireless communication technologies, wireless communication technologies using a technique of performing beamforming using a plurality of antennas are increasing. Beamforming is a technique of outputting/receiving a signal output by a plurality of antennas in a specific direction, and means a technique of forming a beam having a high signal gain in a specific direction. Beamforming, which is one of techniques using multiple antennas, may be used as a method for increasing connection reliability in a wireless environment by using multiple antennas in a receiver or a transmitter. The recently commercialized fifth generation (5G) wireless communication supports beamforming.

In the wireless communication supporting beamforming, communication performance may be reduced when a base station and a portable terminal communicate with each other. One of the causes of the reduced communication performance may be an external object around the portable terminal. As the beam transmitted by the portable terminal is reflected or refracted by an external object, a phenomenon in which communication performance is reduced may occur. When the communication performance is reduced, the portable terminal can increase the communication performance by changing the direction of the beam used to communicate with the base station.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and an operation method of an electronic device for identifying a communication performance of at least one mmWave antenna module determine whether to change a direction of a beam formed by the at least one mmWave antenna module, based on an identification result of the communication performance, measuring a distance between the external object and the electronic device and a location of the external object using the camera, determining an area where beam searching is to be performed from beam coverage, which is an area where a beam formed by the at least one mmWave antenna module can be output, based on the location of the external object and the distance between the external object and the electronic device, controlling the communication processor to perform the beam searching in the determined area, and controlling the communication processor to change the direction of the beam formed by the at least one mmWave antenna module, based on a result of the beam searching.

Due to the decrease in communication performance, the portable terminal may perform beam searching, which is an operation of finding a direction of a beam for increasing communication performance in order to change the direction of the beam.

The beam searching may mean an operation of finding a direction in which communication performance is best among beam coverages, which are ranges of beams which array antennas can output. The portable terminal cannot detect the existence of an external object while performing the beam searching, and when the area where the external object exists is included in the beam coverage, the portable terminal performs the beam searching on the area where the external object exists. The operation described above may cause a phenomenon in which the time consumed for the beam searching is increased and a phenomenon in which power consumed by the beam searching is unnecessarily increased.

When the external object is the human body, a part of the beams formed by the array antennas may be absorbed by the human body. In the case of communication using beam forming, a frequency band is higher than that of other communication means, which may cause an increase in the effect on the human body.

Additional aspects will be set forth in part in the description which follows and, in part, will be apparent from the description, or may be learned by practice of the presented embodiments.

In accordance with an aspect of the disclosure, an electronic device is provided. The electronic device includes at least one mmWave antenna module including a plurality of antennas, a camera capable of measuring a distance between an external object and the electronic device, a communication processor operationally connected to the at least one mmWave antenna module, and an application module operationally connected to the camera and the communication processor, wherein the application processor may be configured to identify a communication performance of the at least one mmWave antenna module, determine whether to change a direction of a beam formed by the at least one mmWave antenna module, based on an identification result of the communication performance, measure a distance between the external object and the electronic device and a location of the external object using the camera, determine an area where beam searching is to be performed from beam coverage, which is an area where a beam formed by the at least one mmWave antenna module can be output, based on the location of the external object and the distance between the external object and the electronic device, control the communication processor to perform beam searching in the determined area, and control the communication processor to change the direction of the beam formed by the at least one mmWave antenna module, based on a result of beam searching.

In accordance with another aspect of the disclosure, an electronic device is provided. The electronic device includes at least one mmWave antenna module including a plurality of antennas, a camera that can measure a distance between an external object and the electronic device, a communication processor operationally connected to the at least one mmWave antenna module, and an application module operationally connected to the camera and the communication processor, wherein the application processor may be configured to activate the camera at a predetermined period, based on an image taken by the camera, identify whether an external object included in the image is a part of the human body, in response to identifying that the external object is a part of the human body, measure a distance between the external object and the electronic device and a location of the external object using the camera, determine a strength of the beam, based on the distance between the external object and the electronic device, and control the communication processor to output the beam at the determined strength.

In accordance with another aspect of the disclosure, an operation method of an electronic device is provided. The operation method includes identifying, by a communication processor, a communication performance of at least one mmWave antenna module including a plurality of antennas, determining, by the communication processor, whether to change a direction of a beam formed by the at least one mmWave antenna module, based on an identification result of the communication performance, measuring, by an application processor, a distance between an external object and the electronic device and a location of the external object using a camera that can measure the distance between the external object and the electronic device, in response to a determination to change the direction of the beam determining, by the application processor, an area where beam searching is to be performed from beam coverage, which is an area where a beam formed by the at least one mmWave antenna module can be outputted, based on the location of the external object and the distance between the external object and the electronic device, and performing, by the communication processor, beam searching with reference to the determined area.

According to the electronic device and the operation method thereof, a location of an external object and a distance between the external object and the electronic device are measured using a camera and an area where beam searching is to be performed is determined based on the measurement result, thereby reducing the size of the area where beam searching is to be performed. Thus, the time required for beam searching can be reduced, and the speed of beam searching can be increased.

According to the electronic device and the operation method thereof, the location of the external object and the distance between the external object and the electronic device are measured using a camera and the area where beam searching is to be performed is determined based on the measurement result, thereby reducing the size of the area where beam searching is to be performed. Thus, the power consumed for beam searching can be decreased.

According to the electronic device and the operation method thereof, the type of the external object, the location of the external object and the distance between the external object and the electronic device are identified using the camera, and the beam intensity may be adjusted, the beam direction may be changed, or the at least one mmWave antenna module to output the beam may be changed based on the identification result. Therefore, when the external object is the human body, the effect of the beam on the human body can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
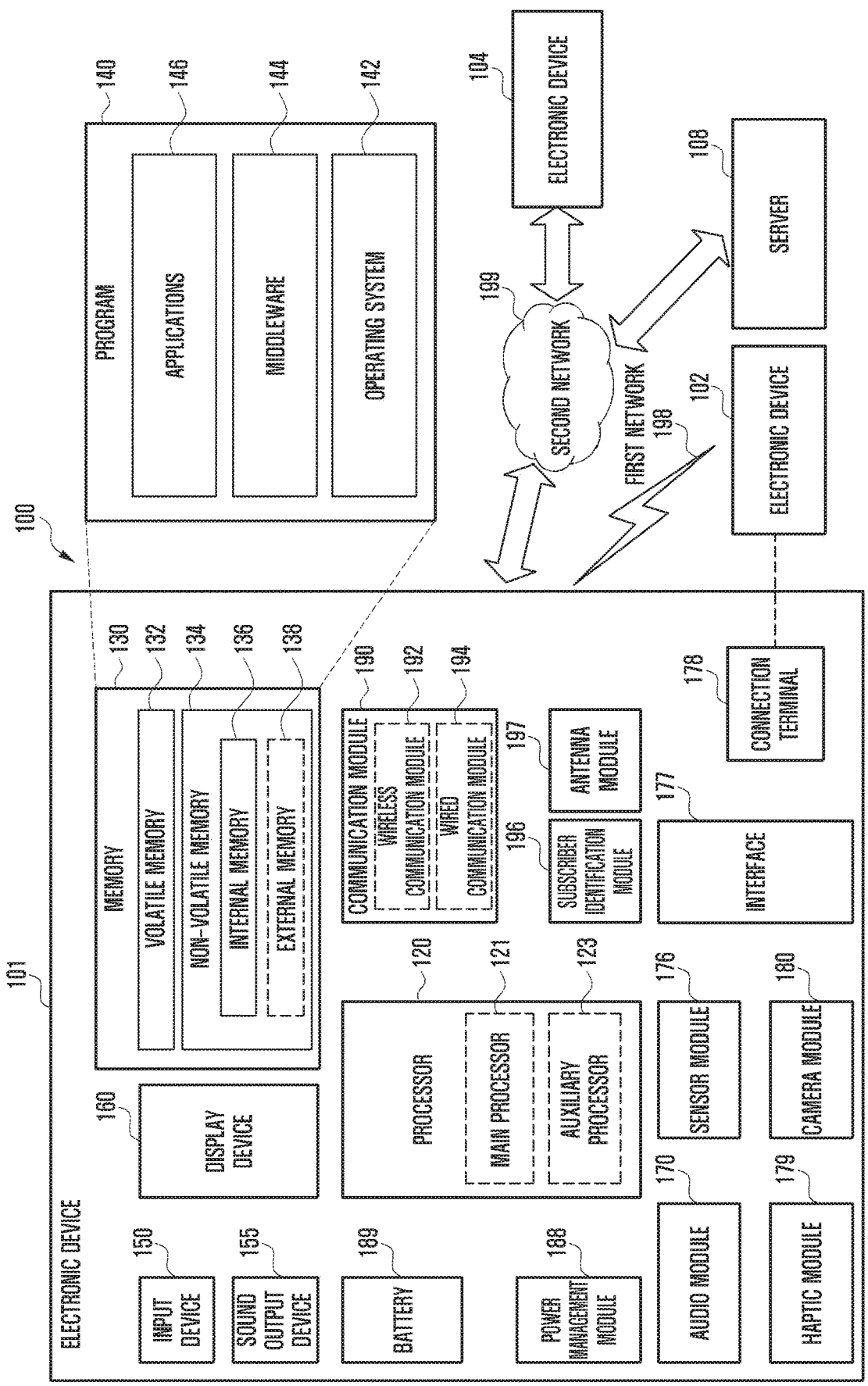
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
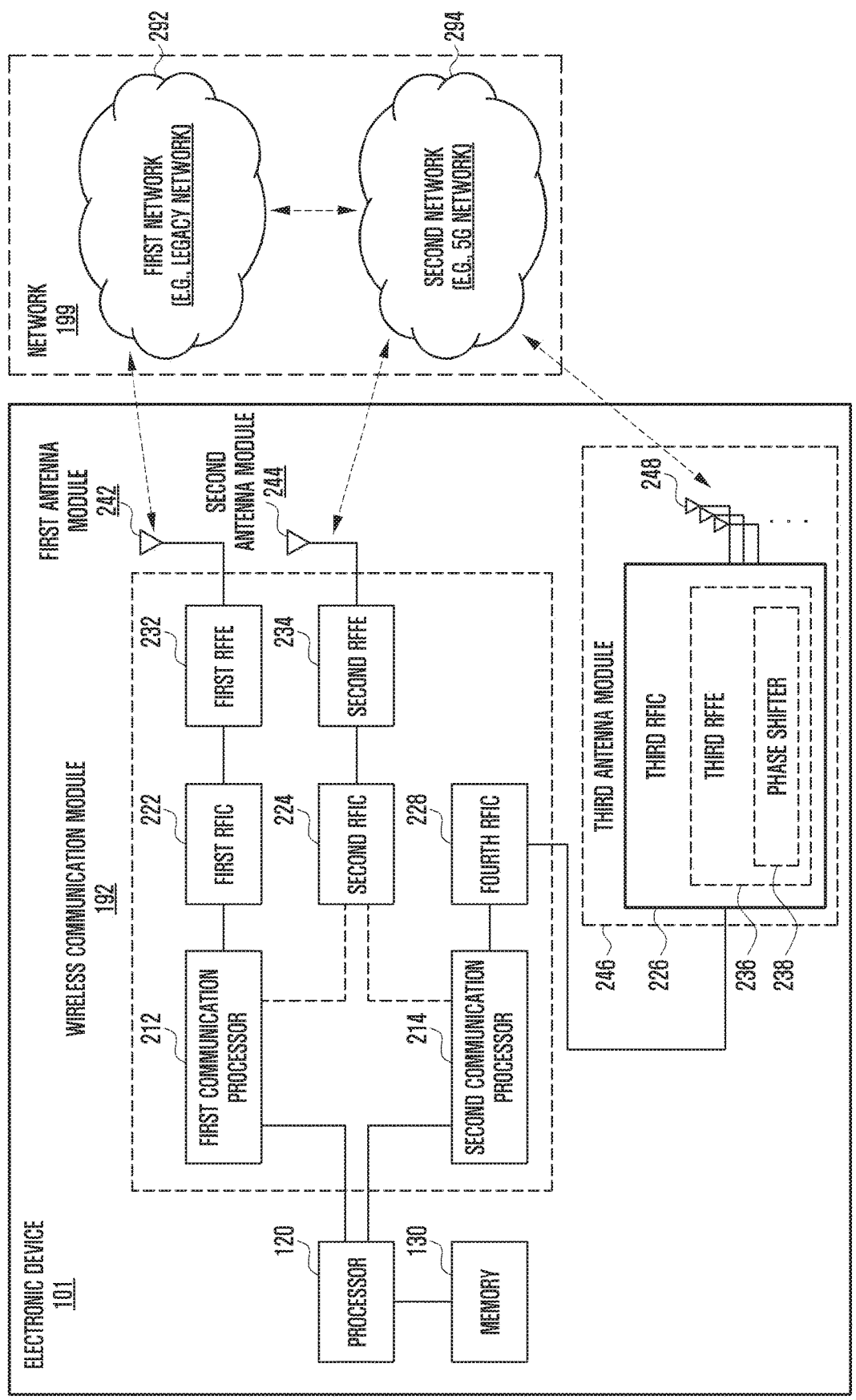
FIG. 2 is a block diagram of an electronic device for supporting Legacy network communication and fifth generation (5G) network communication according to an embodiment of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
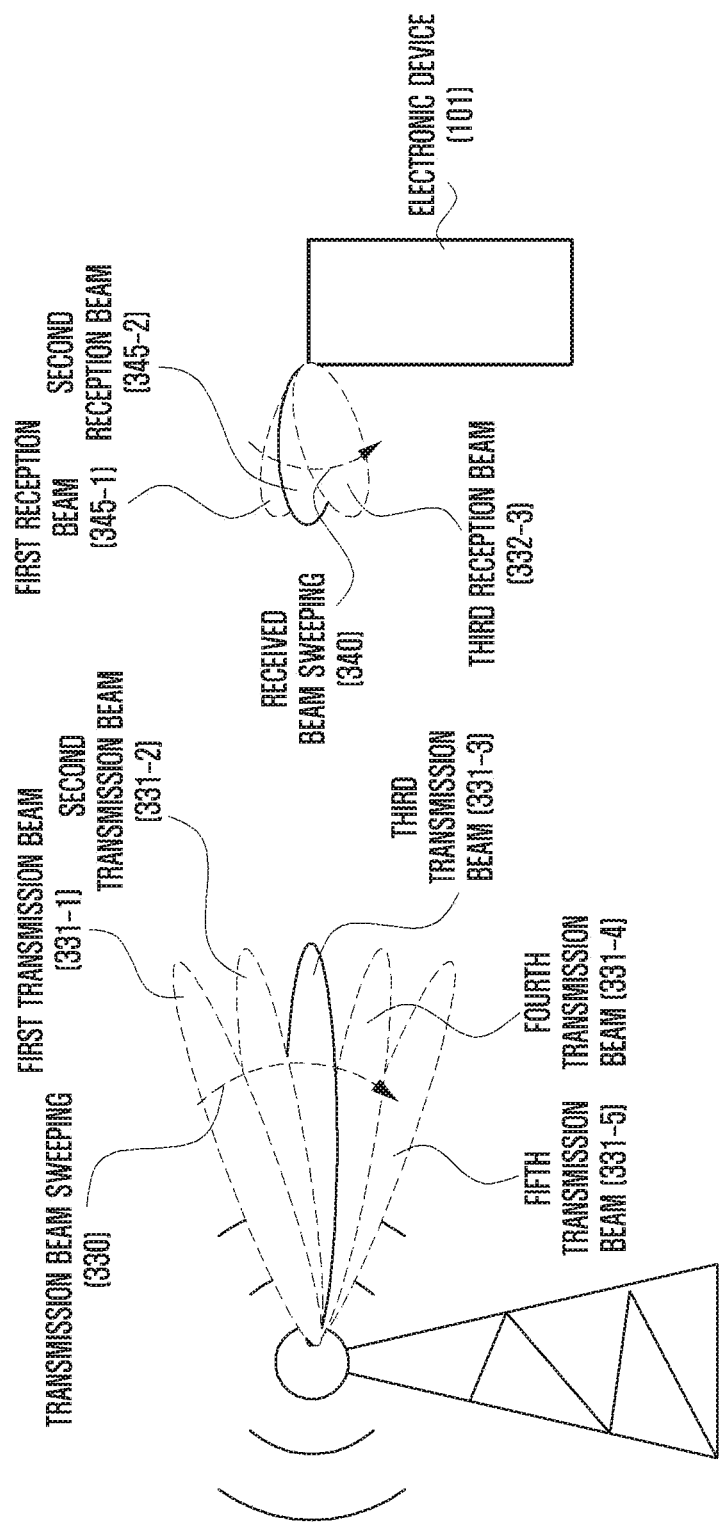
FIG. 3 is a view illustrating an embodiment for wireless communication connection between a base station and an electronic device in a network using a directional beam for wireless connection according to an embodiment of the disclosure.

FIG. 3 illustrates an embodiment of an operation for wireless communication connection between a base station 320 and an electronic device 101, in a second network 294 (e.g., 5G network) of FIG. 2, which uses a directional beam for wireless connection according to an embodiment of the disclosure. First, the base station 320 (e.g., gNodeB (gNB), transmission reception point (TRP)) may perform a beam detection operation with the electronic device 101 for the wireless communication connection. In the illustrated embodiment of the disclosure, for the beam detection, the base station 320 may sequentially transmit a plurality of transmission beams, for example, first to fifth transmission beams 331-1 to 331-5 with different directions, so that at least one transmission beam sweeping 330 can be performed.

Referring to FIG. 3, the first to fifth transmission beams 331-1 to 331-5 may include at least one synchronization sequences/physical broadcast channel (SS/PBCH) block. The SS/PBCH block may be used to periodically measure the channel or beam intensity of the electronic device 101.

In another embodiment of the disclosure, the first to fifth transmission beams 331-1 to 331-5 may include at least one channel state information-reference signal (CSI-RS). The CSI-RS is a standard/reference signal that can be configured flexibly by the base station 320, and may be transmitted periodically/semi-persistently, or aperiodically. The electronic device 101 may measure the channel or beam intensity using the CSI-RS.

The transmission beams may form a radiation pattern having a selected beam width. For example, the transmission beams may have a broad radiation pattern having a first beam width or a sharp radiation pattern having a second beam width that is narrower than the first beam width. For example, the transmission beams including the SS/PBCH block may have a wider radiation pattern than the transmission beams including the CSI-RS.

The electronic device 101 may perform reception beam sweeping 340 while the base station 320 performs transmission beam sweeping 330. For example, the electronic device 101 may receive the signal of the SS/PBCH block transmitted in at least one of the first to fifth transmission beams 331-1 to 331-5 by fixing the first reception beam 345-1 in a first direction, while the base station 320 performs the first transmission beam sweeping 330. The electronic device 101 may receive the signal of the SS/PBCH block transmitted in the first to fifth transmission beams 331-1 to 331-5 by fixing the second reception beam 345-2 in a second direction, while the base station 320 performs the second transmission beam sweeping 330. The electronic device 101 may receive the signal of the SS/PBCH block transmitted in the first to fifth transmission beams 331-1 to 331-5 by fixing the third reception beam 332-3 in a third direction, while the base station 320 performs the third transmission beam sweeping 330. As such, the electronic device 101 may select a communicable reception beam (e.g., the second reception beam 345-2) and a communicable transmission beam (e.g., the third transmission beam 331-3), based on a result of the signal reception operation via the reception beam sweeping 340.

As described above, after the communicable transmission and reception beams are determined, the base station 320 and the electronic device 101 may transmit and/or receive basic information for cell configuration, and may configure information for additional beam operation, based on the information. For example, the beam operation information may include detailed information on the configured beam, or configuration information on the SS/PBCH block, CSI-RS or an additional reference signal.

In addition, the electronic device 101 may continuously monitor the intensities of the channel and beam using at least one of the SS/PBCH block and the CSI-RS included in the transmission beam. The electronic device 101 may adaptively select a beam having a good beam quality using the monitoring operation. Optionally, when the communication connection is released due to the movement of the electronic device 101 or the blockage of the beam, the above-described beam sweeping may be performed again to determine a communicable beam.

Figure 4:
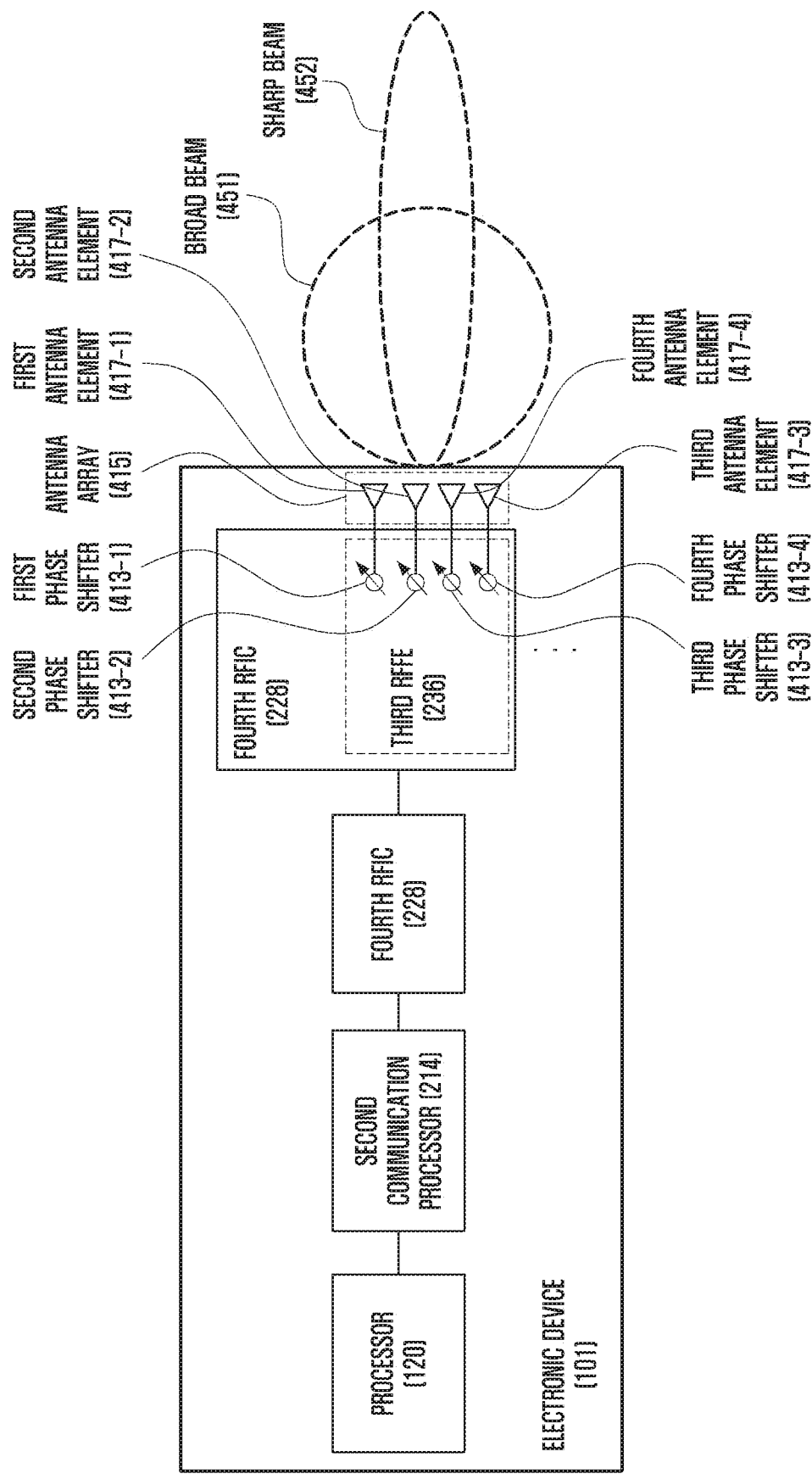
FIG. 4 is a block diagram of an electronic device for 5G network communication according to an embodiment of the disclosure.

FIG. 4 is a block diagram of an electronic device 101 for 5G network communication according to an embodiment of the disclosure.

Referring to FIG. 4, although the electronic device 101 may include various components shown in FIG. 2, the electronic device 101 is illustrated to include a processor 120, a second communication processor 214, a fourth RFIC 228, and at least one third antenna module 246, for brief description.

In the illustrated embodiment of the disclosure, the third antenna module 246 may include first to fourth phase shifters 413-1 to 413-4 (e.g., a phase shifter 238 of FIG. 2) and/or first to fourth antenna elements 417-1 to 417-4 (e.g., an antenna 248 of FIG. 2). Each one of the first to fourth antenna elements 417-1 to 417-4 may be electrically connected to an individual one of the first to fourth phase shifters 413-1 to 413-4. The first to fourth antenna elements 417-1 to 417-4 may form at least one antenna array 415.

The second communication processor 214 may control phases of signals transmitted and/or received through the first to fourth antenna elements 417-1 to 417-4 by controlling the first to fourth phase shifters 413-1 to 413-4, thereby generating a transmission beam and/or a reception beam in a selected direction.

According to an embodiment of the disclosure, the third antenna module 246 may form a broad radiation pattern beam 451 (hereinafter referred to as "a wide beam") or a narrow radiation pattern beam 452 (hereinafter referred to as "a narrow beam") mentioned above, depending on the number of the used antenna elements. For example, the third antennal module 246 may form the narrow beam 452 when all of the first to fourth antennal elements 417-1 to 417-4 are used, and may form the wide beam 451 when only the first antenna element 417-1 and the second antenna element 417-2 are used. The wide beam 451 has wider coverage than the narrow beam 452, but has a smaller antenna gain, and thus may be more effective at the time of beam searching. On the other hand, the narrow beam 452 has narrower coverage than the wide beam 452, but has a higher antenna gain, thereby improving communication performance.

According to an embodiment of the disclosure, the second communication processor 214 may utilize a sensor module 176 (e.g., a 9-axis sensor, a grip sensor, or a GPS) for beam searching. For example, the electronic device 101 may adjust the searching location of the beam and/or the beam searching period, based on the location and/or movement of the electronic device 101 using the sensor module 176. As another example, when the electronic device 101 is gripped by the user, a grip sensor may be used to grasp the gripped part by the user, thereby selecting an antenna module having better communication performance among the plurality of third antenna modules 246.

Figure 5:
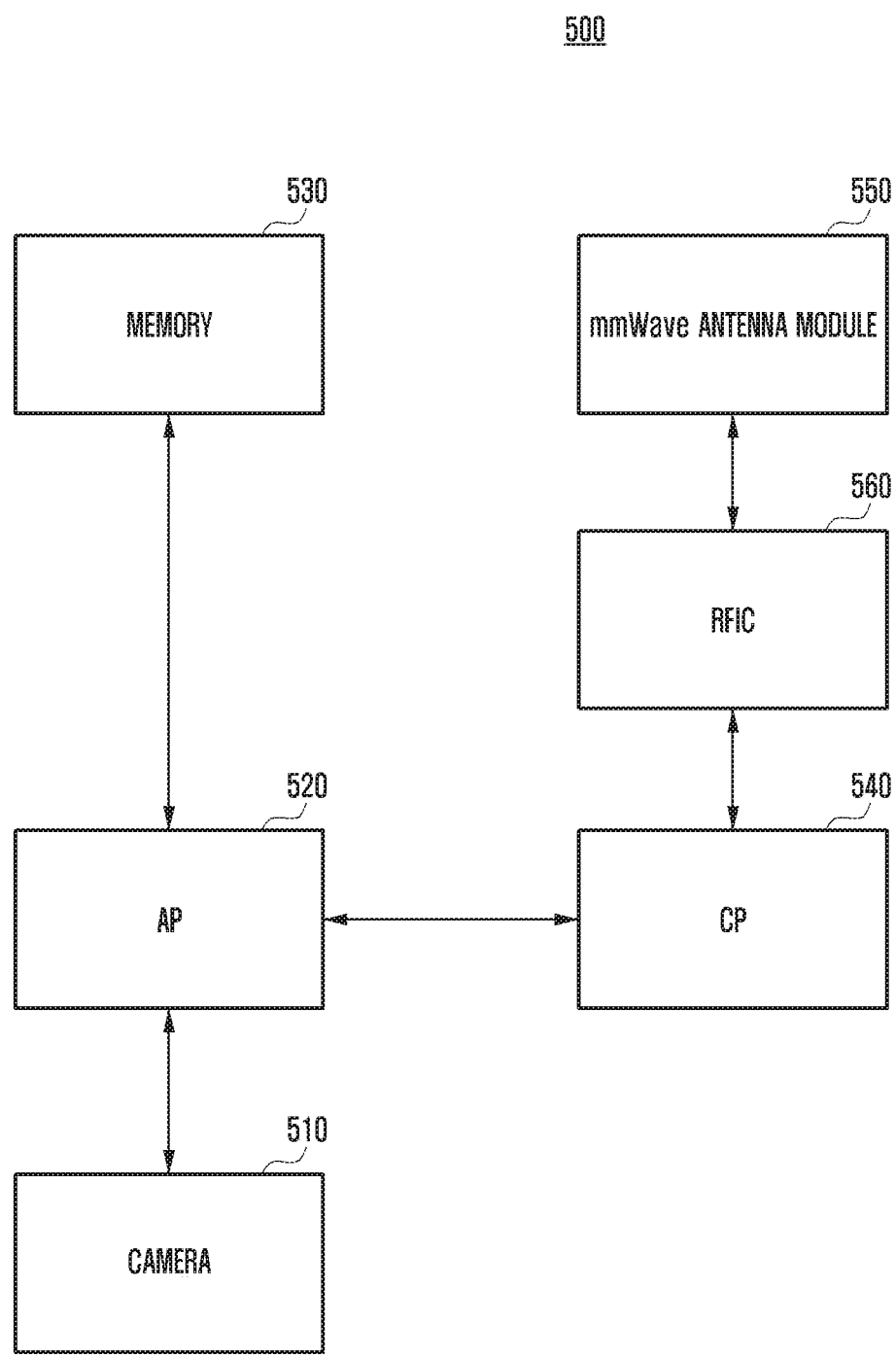
FIG. 5 is a block diagram of an electronic device according to an embodiment of the disclosure.

FIG. 5 is a block diagram of an electronic device according to an embodiment of the disclosure.

Referring to FIG. 5, the electronic device 500 (e.g., the electronic device 101 of FIG. 1) may include a camera 510 (e.g., the camera module 180 of FIG. 1), an application processor 520 (e.g., the processor 120 of FIG. 1), a memory 530 (e.g., the memory 130 of FIG. 1), a communication processor 540 (e.g., the second communication processor 212 or the third communication processor 214 of FIG. 2), and an mmWave antenna module 550 (e.g., the third antenna module 246 of FIG. 2).

According to various embodiments of the disclosure, the camera 510 may detect the existence of an external object (not shown). The camera 510 may measure a location of the external subject and a distance between the external object and the electronic device 500. The camera 510 may be implemented in various forms capable of measuring the location of the external object and the distance between the external object and the electronic device 500. For example, the camera 510 may be implemented as a time of flight (ToF) camera. The camera 510 may output radio waves (e.g., infrared rays implemented as pulses) in various directions and measure the location of the external object and the distance between the electronic device 500 and the external object, based on the time when the output radio waves are reflected by the external object and returned.

According to various embodiments of the disclosure, the mmWave antenna module 550 may include a plurality of antennas. The plurality of antennas may be arranged in a specific form. The mmWave antenna module 550 may radiate a beam having directivity in a predetermined direction, based on the control of the communication processor 540. The communication processor 540 may receive information related to the direction of a beam to be radiated from a base station. The amplitude and phase of a signal formed by each of the plurality of antennas included in the mmWave antenna module 550 may be different so that the mmWave antenna module 550 may radiate a beam having directivity. The communication processor 540 may change the direction of the beam radiated by the mmWave antenna module 550 by controlling the amplitude and phase of the signal formed by each of the plurality of antennas.

According to various embodiments of the disclosure, the mmWave antenna module 550 may be electrically connected to an RFIC 560 (e.g., a fourth RFIC 228 of FIG. 4). The RFIC 560 may be connected between the mmWave antenna module 550 and the communication processor 540. When the communication processor 540 supports a direct conversion scheme, the RFIC 560 may be omitted.

According to various embodiments of the disclosure, the electronic device 500 may include at least one mmWave antenna module 550 to radiate beams in various directions. For example, four mmWave antenna modules 550 in total may be disposed on a rear surface of the electronic device 500, on a left surface of the electronic device 500, on a right surface of the electronic device 500, and on a lower surface of the electronic device 500, respectively. The number and location of the mmWave antenna modules 550 may be changed according to the designer's intention.

According to various embodiments of the disclosure, the communication processor 540 may establish a communication channel of a band to be used for wireless communication and perform various operations for supporting wireless communication using the established communication channel. The wireless communication may mean communication supporting beam-forming (e.g., a 5G network). The communication processor 540 may control the mmWave antenna module 550 such that the mmWave antenna module 550 radiates a beam having directivity in a certain direction under the control of the application processor 520. The communication processor 540 may identify the communication performance according to a predetermined period while performing communication. The communication processor 540 may change the direction in which the beam is output, based on the control of a base station in response to identification that the communication performance is less than or equal to a predetermined value, or may radiate a beam by using another mmWave antenna module 550, thereby improving the communication performance. The communication processor 540 may change the direction in which the beam is output with reference to a beam book stored in the memory 530. The beam book may mean data including information on the amplitude and phase of a signal formed by the plurality of antennas included in the mmWave antenna module 550 in order for the mmWave antenna module 550 to output a beam in a certain direction. The beam book will be described later with reference to FIGS. 7A and 7B.

According to various embodiments of the disclosure, the application processor 520 may be operationally connected to the camera 510 and the communication processor 540 to control the communication processor 540 to change the direction of a beam in order to improve the communication performance. The application processor 520 may control the communication processor 540 to perform beam searching in order to change the direction of a beam. The beam searching may mean an operation of searching for a direction of a beam having the best communication performance in a predetermined range.

According to various embodiments of the disclosure, the application processor 520 may measure the existence of an external object around the electronic device 500, the location of the external object, and the distance between the external object and the electronic device 500 using the camera 510, and may determine an area where beam searching is to be performed, based on the location of the external object and the distance between the external object and the electronic device 500. The application processor 520 may transmit information related to the determined area to the communication processor 540 after determining the area for performing beam searching. The communication processor 540 may perform beam searching, based on the information related to the determined area. By considering the location of the external object and the direction and distance between the external object and the electronic device 500 in determining the area in which the electronic device 500 performs beam searching, efficient beam searching can be performed and power consumed for beam searching can be reduced. Hereinafter, a specific embodiment for determining the area for performing beam searching will be described.

According to various embodiments of the disclosure, the communication processor 540 may identify data related to the communication performance while performing communication. The communication performance may mean transmission performance or reception performance of the electronic device 500, and the data related to communication performance may mean data indicating the measured communication performance in various ways including the block error rate (BLER), signal to noise ratio (SNR), or electric field strength (e.g., reference signal received power (RSRP)) identified by the communication processor 540.

According to various embodiments of the disclosure, the communication processor 540 may identify the communication performance and determine whether to change the direction of the beam formed by the mmWave antenna module 550, based on an identification result. The communication processor 540 may determine to change the direction of the beam in response to identifying that the communication performance (e.g., BLER) is equal to or less than a predetermined value. The direction of the beam to be changed may mean a direction in which the communication performance is most increased when the electronic device 500 communicates in the direction of the beam to be changed. The communication processor 540 may transmit information indicating that the direction of the beam needs to be changed to the application processor 520.

According to various embodiments of the disclosure, the application processor 520 may compare the range where the camera 510 can photograph and beam coverage which means a range of the beam in which the mmWave antenna module 550 can output, in response to receiving the information indicating that the direction of the beam needs to be changed. The range in which the camera 510 can photograph may mean an angle of view of the camera 510 and may be previously stored in the memory 530. The beam coverage may mean a range of the beam that the mmWave antenna module 550 can form, and may be previously stored in the memory 530. The application processor 520 may compare the range in which the camera 510 can photograph and the beam coverage of the mmWave antenna module 550 and determine whether to activate the camera 510, based on the comparison result. When at least portions of the range in which the camera 510 can photograph and the beam coverage of the mmWave antenna module 550 overlap, the application processor 520 may activate the camera 510 and control the camera 510 to identify whether an external object exists around the electronic device 500. The application processor 520 may perform beam searching for a portion of the beam coverage region, based on the information obtained using the camera 510.

According to various embodiments of the disclosure, when the range in which the camera 510 can photograph and the beam coverage of the mmWave antenna module 550 do not overlap, the application processor 520 may determine the direction of the beam in which the communication performance is increased by performing beam searching on the beam coverage without activating the camera 510.

According to another embodiment of the disclosure, instead of performing an operation of comparing the beam coverage of the mmWave antenna module 550 with the range in which the camera 510 can photograph while performing communication, in order to reduce the load that may occur due to the operation, the application processor 520 may generate mapping data, which is data obtained by comparing the beam coverage of the mmWave antenna module 550 with the range in which the camera 510 can photograph and may store the generated mapping data in the memory 530. For example, a mapping data lookup table may be stored in the memory 530.

According to various embodiments of the disclosure, the mapping data may include information indicating whether to activate the camera 510 when performing a beam searching operation on each of the plurality of the mmWave antenna modules 550. The application processor 520 may identify the mmWave antenna module 550 used during communication and determine whether to activate the camera 510 using the comparison data stored in the memory 530.

According to various embodiments of the disclosure, the application processor 520 may measure the existence of an external object, a type of the external object, a location of the external object and a distance between the external object and the electronic device 500 using the camera 510, in response to a determination to activate the camera 510.

According to various embodiments of the disclosure, the application processor 520 may determine a region where beam searching is to be performed among the beam coverage areas of the mmWave antenna module 550, based on the measurement result.

According to various embodiments of the disclosure, the application processor 520 may determine the remaining area of the beam coverage areas except for the area corresponding to the location of the external object included in the measurement result as the area where beam searching is to be performed. The area where the external object exists may have a high possibility of deteriorating the communication performance due to the existence of the external object. According to various embodiments of the disclosure, the application processor 520 may perform beam searching efficiently by determining the remaining area except for the area corresponding to the location of the external object as the area where beam searching is to be performed.

According to various embodiments of the disclosure, the application processor 520 may determine the area where beam searching is to be performed in the beam coverage areas, based on the location of the external object and the direction and distance between the external object and the electronic device 500 included in the measurement result. When the distance between the external object and the electronic device 500 is less than or equal to a predetermined value, the application processor 520 may determine the remaining area except for the area corresponding to the location of the external object in the beam coverage areas as the area where beam searching is to be performed. When the distance between the external object and the electronic device 500 is greater than or equal to the predetermined value, communication performance degradation due to the external object may be small. According to various embodiments of the disclosure, the application processor 520 may perform beam searching efficiently by additionally considering the distance between the external object and the electronic device 500.

According to various embodiments of the disclosure, the application processor 520 may determine the area where beam searching is to be performed in the beam coverage areas, based on the type of the external object included in the measurement result. When the type of the external object is a human body, the application processor 520 may determine the remaining area except for the area corresponding to the location of the external object in the beam coverage areas as the area where beam searching is to be performed. When the external object is a human body, radiating a beam to the area where the external object exists may affect the human body and may cause degradation in communication performance. According to various embodiments of the disclosure, the application processor 520 may perform beam searching efficiently by additionally considering the type of the external object.

According to various embodiments of the disclosure, the application processor 520 may compare the size of the area where the external object exists and the size of the beam coverage, and determine whether to change the mmWave antenna module 550 to perform communication, based on the comparison result. When the external object is located too close to the electronic device 500, it may be difficult to improve the communication performance even if the direction of the beam is changed. The application processor 520 may control the communication processor 540 to change the mmWave antenna module 550 to perform communication when the size of the area where the external object exists occupies a predetermined portion or more in the beam coverage.

According to various embodiments of the disclosure, the mmWave antenna module 550 may include a plurality of antenna arrays. Each antenna array may be disposed in the mmWave antenna module 550 to form a beam in a different direction. When an external object exists in a direction in which an antenna array used to perform communication radiates a signal and the distance between the external object and the electronic device 500 is less than or equal to a predetermined distance, the communication processor 540 may change to another antenna array included in the mmWave antenna module 550 and perform communication.

According to various embodiments of the disclosure, the application processor 520 may determine whether to change the mmWave antenna module 550 based on a relative location of the external object included in the image photographed by the camera 510. The application processor 520 may identify the ratio of the external object to the upper region of the image and identify whether the ratio to the upper region is greater than or equal to a predetermined value. When the external object exists in the upper region, the communication performance may decrease as the beam radiated for communication with a base station is blocked or reflected by the external object. The application processor 520 may determine to change the mmWave antenna module 550 to perform communication, in response to identification that the ratio of the external object to the upper region is greater than or equal to the predetermined value. According to various embodiments of the disclosure, the application processor 520 may improve the communication performance by changing the mmWave antenna module 550 to perform communication when an external object exists at an upper region.

According to various embodiments of the disclosure, after changing the mmWave antennal module 550, based on the control of the application processor 520, the communication processor 540 may measure the communication performance and perform hand-over for changing the base station for performing communication when identifying that the communication performance is equal to or less than a predetermined value.

According to various embodiments of the disclosure, the communication processor 540 may perform beam searching by referring to an area where beam searching is to be performed, which is generated based on the location of the external object and the direction and distance between the external object and the electronic device 500. The communication processor 540 may change the direction of the beam formed by the mmWave antennal module 550, based on the beam searching result. The communication processor 540 may transmit the beam searching result to a base station and may change the direction of the beam formed based on the control of the base station. The communication performance can be improved by changing the direction of the beam formed by the mmWave antenna module 550 based on the location of the external object and the direction and distance between the external object and the electronic device 500.

Figure 6:
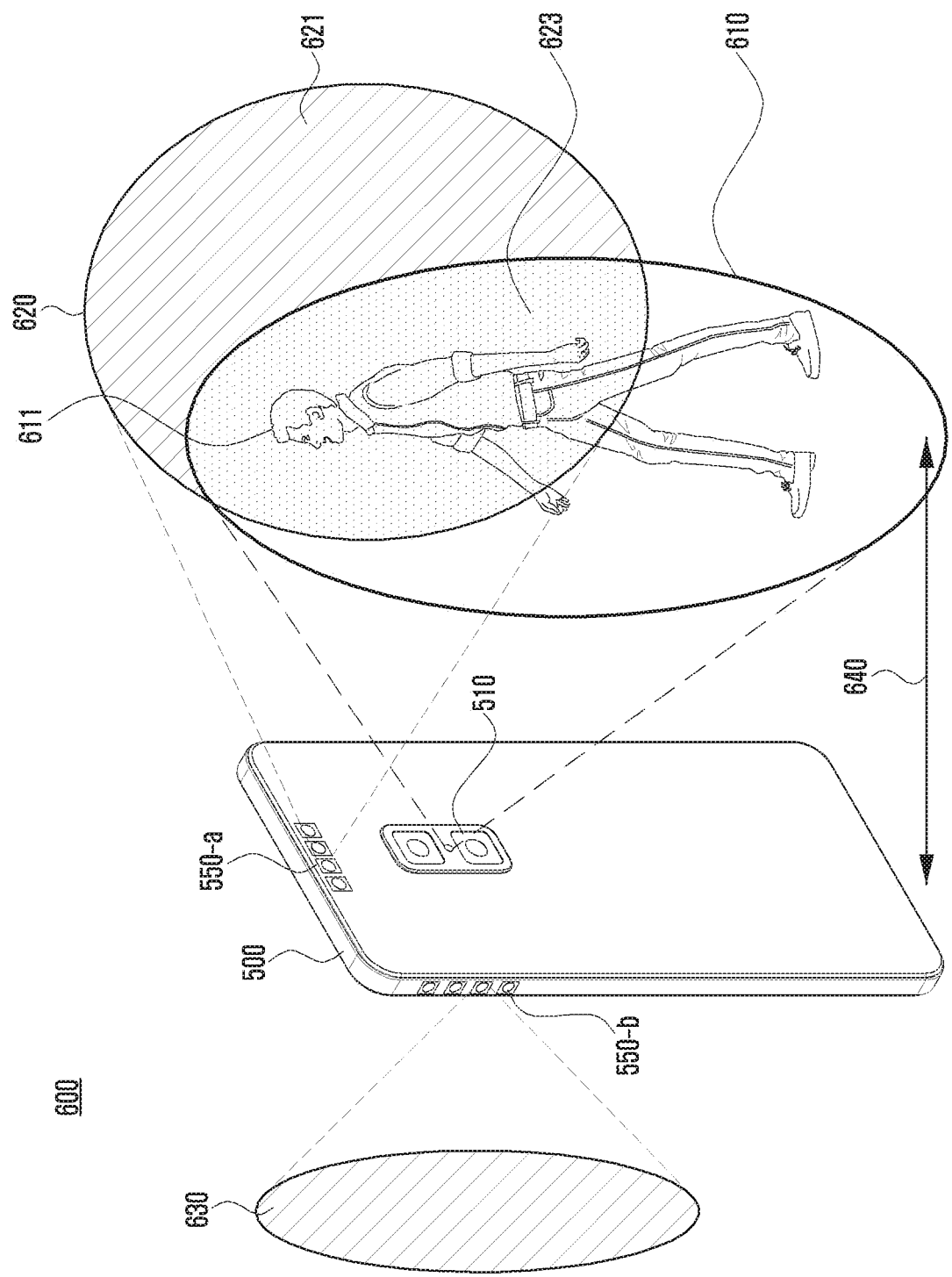
FIG. 6 is a view illustrating an embodiment of comparing beam coverage and an area where a camera can photograph, in an electronic device according to an embodiment of the disclosure.

FIG. 6 is a view illustrating an embodiment 600 of comparing beam coverage with an area that may be photographed using a camera, in an electronic device according to an embodiment of the disclosure.

Referring to FIG. 6, an electronic device (e.g., the electronic device 500 of FIG. 5) may include a camera 510 and a plurality of mmWave antenna modules (e.g., a first mmWave antenna module 550-*a* and a second mmWave antenna module 550-*b*). For convenience of description, it is assumed that the electronic device 500 is performing communication using the first mmWave antenna module 550-*a*.

According to various embodiments of the disclosure, a communication processor (e.g., the communication processor 540 of FIG. 5) may identify data related to the communication performance and change a direction of a beam, based on the control of a base station to improve the communication performance. The change in the direction of the beam may mean the change in the direction of the beam radiated by the first mmWave antenna module 550-*a*. The first mmWave antenna module 550-*a* may change the direction of the beam within the coverage 620 of the beam. The direction of the beam to be changed may mean a direction in which the communication performance increases when the electronic device 500 performs communication in the direction of the beam to be changed.

According to various embodiments of the disclosure, in response to receiving the information indicating to change the direction of the beam transmitted by the communication processor 540, an application processor 520 may compare a range 610 that the camera can photograph with the beam coverage 620 of the first mmWave antenna module 550-a, and may identify that the range 610 that the camera can photograph and the beam coverage 620 of the first mmWave antenna module 550-a partially overlap.

According to various embodiments of the disclosure, when the electronic device 500 performs communication using the second mmWave antenna module 550-b, the application processor 520 may identify that the range 610 that the camera 510 can photograph and the beam coverage 630 of the second mmWave antenna module 550-b do not overlap.

According to various embodiments of the disclosure, in response to identification that the photographable range 610 and the beam coverage 620 partially overlap, the application processor 520 may activate the camera 510 and measure the existence of an external object 611, the type of the external object 611, the location of the external object 611, and the distance between the external object 611 and the electronic device 500 using the camera 510.

According to various embodiments of the disclosure, the application processor 520 may determine an area where beam searching is to be performed among the beam coverage areas of the first mmWave antenna module 550-a, based on the measurement result.

According to various embodiments of the disclosure, the application processor 520 may determine an area where beam searching is to be performed, based on the location of the external object 611 and the distance 640 between the external object 611 and the electronic device 500 included in the beam coverage.

Referring to FIG. 6, it can be seen that a part of the area 623 of the beam coverage 620 of the first mmWave antenna module 550-a is covered by the external object 611. The application processor 520 may determine the remaining area 621 except for the area 623 corresponding to the external object 611 among the beam coverage areas 620 as the area where beam searching is to be performed, based on the location of the external object 611 and the distance 640 between the external object 611 and the electronic device 500, measured by the camera 510.

According to various embodiments of the disclosure, the application processor 520 may determine the remaining area 621 except for the area 623 corresponding to the external object 611 as the area where beam searching is to be performed, thereby reducing the size of the area where beam searching is to be performed. As the size of the area where beam searching is to be performed is reduced, it is possible to reduce the time required for beam searching, thereby reducing the amount of power consumed for beam searching and increasing the communication performance.

According to various embodiments of the disclosure, the application processor 520 may compare the size 623 of the area where the external object 611 exists with the size 620 of the beam coverage, and determine whether to change the first mmWave antenna module 550-a to perform communication to another mmWave antenna module (e.g., the second 550-b), based on the comparison result. When the external object 611 is located too close to the electronic device 500, even if the direction of the beam is changed, it may be difficult to improve the communication performance. When the size 623 of the area where the external object 611 exists occupies a certain portion or more in the beam coverage 620, the application processor 520 may control the communication processor 540 to change the first mmWave antenna module 550-a to perform communication to another mmWave antenna module 550-b.

Figure 7A:
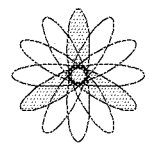
FIG. 7A is a view illustrating a beam book containing information on beam coverage in an electronic device according to an embodiment of the disclosure.
Figure 7A:
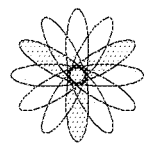
Figure 7A:

FIG. 7A is a view illustrating an embodiment 700 of a beam book including information on beam coverage in an electronic device according to an embodiment of the disclosure.

According to various embodiments of the disclosure, the beam book may mean data including information on the amplitudes and phases of signals formed by a plurality of antennas included in the mmWave antenna module 550 in order for the mmWave antenna module 550 to output a beam in a specific direction.

Referring to FIG. 7A, the beam book may be implemented in the form of a table. The beam book may include a direction of a beam in which mmWave antenna module (e.g., the mmWave antenna module 550 of FIG. 5) can radiate and a designated index. The index may be implemented in various forms, and in FIG. 7A, the index may be implemented as numeric data 1, 2, 3, . . . , and 64. Although the beam book illustrated in FIG. 7A is illustrated on the assumption that mmWave antenna modules 550 can radiate beams in 64 directions, the beam book may be implemented in various forms according to the directions of the beams that can be radiated by the mmWave antenna module 550.

According to various embodiments of the disclosure, the beam book may include information on the amplitudes and phases of the signals formed by the plurality of antennas to radiate in the direction of the designated beam for each index.

For example, the beam book may include information on the amplitudes and phases of the signals formed by the plurality of antennas to radiate beams in the direction corresponding to index 1. The plurality of antennas may radiate signals having different phases between the plurality of antennas in order to radiate beams in a specific direction. The beam book may include a phase difference (delay) of a signal formed by each of the plurality of antennas to radiate a beam in a specific direction. Assuming that the spacing between the antennas is the same, the phase difference may be determined based on the spacing between the antennas and the radiation direction of the beam. The beam book may include a phase difference value corresponding to the radiation direction of the beam for each radiation direction of the beam.

According to various embodiments of the disclosure, an electronic device 500 may perform beam searching using the beam book illustrated in FIG. 7A. When a range in which a camera 510 can photograph and the beam coverage of the mmWave antenna module 550 do not overlap, the electronic device 500 may perform beam searching using the beam book illustrated in FIG. 7A without activating the camera 510, thereby determining the direction of the beam having the highest communication performance.

Figure 7B:
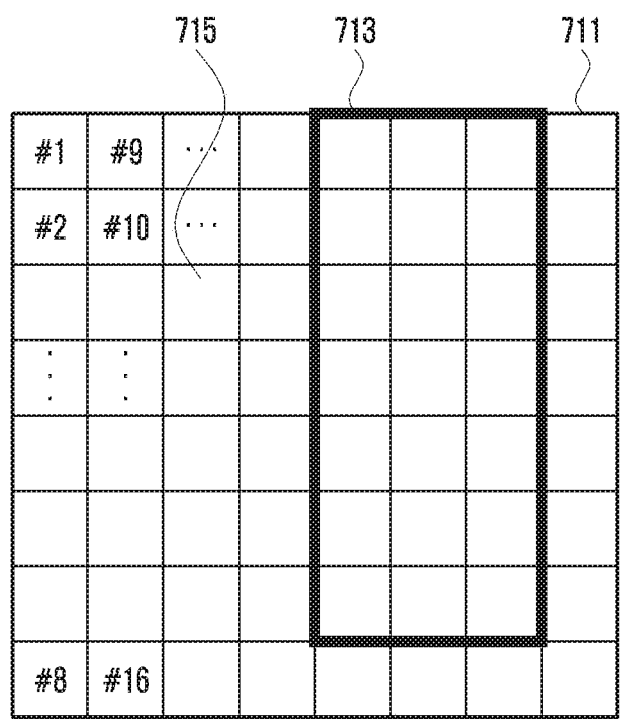
FIG. 7B is a view illustrating an embodiment of determining an area where beam searching is to be performed based on an external object in an electronic device according to an embodiment of the disclosure.

FIG. 7B is a view illustrating an embodiment of determining an area in which beam searching is to be performed based on an external object, in an electronic device according to an embodiment of the disclosure.

According to various embodiments of the disclosure, in response to a determination to change the direction of the beam, an electronic device (e.g., the electronic device 500 of FIG. 5) may compare the range in which a camera (e.g., the camera 510 of FIG. 5) can photograph with the beam coverage, which means a range of the beam in which the mmWave antenna module (e.g., the mmWave antenna module 550 of FIG. 5) can output. When at least portions of the range in which the camera 510 can photograph and the beam coverage of the mmWave antenna module 550 overlap, the electronic device 500 may activate the camera 510 and control the camera 510 to identify whether an external object (e.g., the external object 611 of FIG. 6) exists around the electronic device 500, the location of the external object 611, and the distance between the external object 611 and the electronic device 500. The electronic device 500 may determine an area in which beam searching is to be performed, based on the information obtained using the camera 510.

According to various embodiments of the disclosure, the electronic device 500 may determine an area in which beam searching is to be performed and may modify the beam book 701 illustrated in FIG. 7A. The electronic device 500 may modify the beam book 701 by excluding an index corresponding to an area corresponding to the location of the external object 611 in the beam book 701 from an index to be used for beam searching.

According to another embodiment of the disclosure, the electronic device 500 may determine an area corresponding to the remaining index 715 except for the index 713 corresponding to the area corresponding to the location of the external object 611 as an area in which beam searching is to be performed, in determining the area in which beam searching is to be performed. The electronic device 500 may skip beam searching of an area corresponding to the location of the external object 611.

According to another embodiment of the disclosure, the electronic device 500 may skip beam searching. When beam searching is skipped, the electronic device 500 may control the communication processor 540 to form a beam using an antenna array other than the antenna array forming the beam among the plurality of antenna arrays included in the mmWave antenna module 550.

FIG. 7B illustrates a modified beam book 711 according to an embodiment of the disclosure.

Referring to FIG. 7B, the electronic device 500 may perform beam searching in the area corresponding to the remaining indexes 715 except for the indexes 713 corresponding to the external object 611.

According to various embodiments of the disclosure, the electronic device 500 may determine the area corresponding to the remaining indexes except for the indexes corresponding to the location of the external object as an area where beam searching is to be performed, modify the beam book, and perform effective beam searching using the modified beam book.

When the electronic device 500 performs beam searching using the beam book before modification illustrated in FIG. 7A, beam searching may be performed in 64 directions. When the electronic device 500 performs beam searching using the modified beam book illustrated in FIG. 7B, beam searching may be performed in only 42 directions without performing beam searching in 21 directions. Therefore, the electronic device 500 according to various embodiments may acquire a fast beam searching speed.

Figure 8:
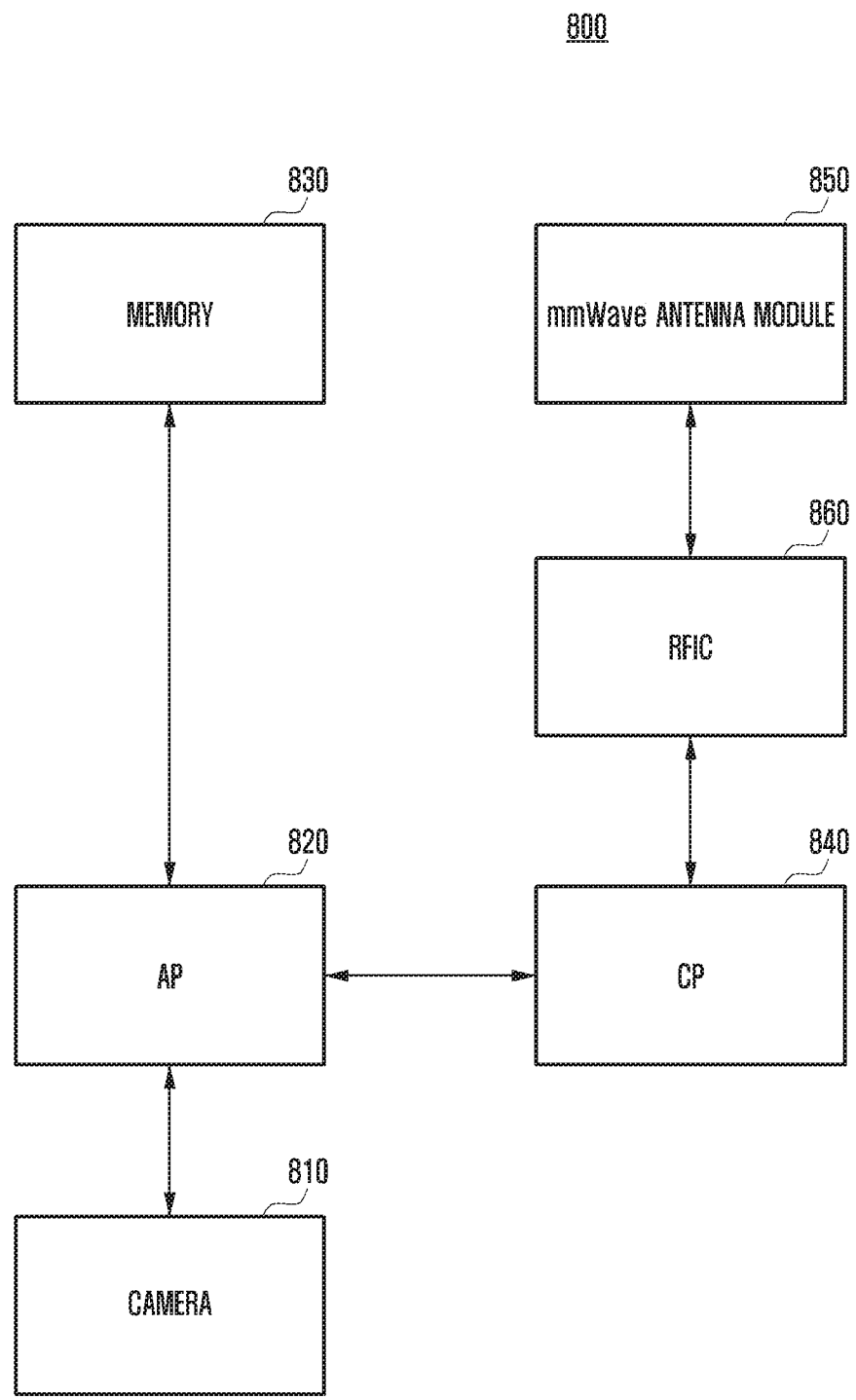
FIG. 8 is a block diagram of an electronic device according to an embodiment of the disclosure.

FIG. 8 is a block diagram of an electronic device according to an embodiment of the disclosure.

Referring to FIG. 8, the electronic device 800 (e.g., the electronic device 500 of FIG. 5) according to various embodiments may include a camera 810 (e.g., the camera 510 of FIG. 5), an application processor 820 (e.g., the application processor 520 of FIG. 5), a memory 830 (e.g., the memory 530 of FIG. 5), a communication processor 840 (e.g., the communication processor 540 of FIG. 5), and an mmWave antenna module 850 (e.g., the mmWave antenna module 550 of FIG. 5).

According to various embodiments of the disclosure, the camera 810 may detect the existence of an external object (e.g., the external object 611 of FIG. 6). The camera 810 may measure a location of the external object 611 and a distance between the external object 611 and the electronic device 800. The camera 810 may be implemented in various forms capable of measuring the location of the external object 611 and the distance between the external object 611 and the electronic device 800. For example, the camera 810 may be implanted as a time of flight (ToF) camera. The camera 810 may output radio waves (e.g., infrared rays implemented in the form of pulses) in various directions and may measure the location of the external object 611 and the distance between the electronic device 800 and the external object 611, based on the time when the output radio waves are reflected by the external object 611 and returned.

According to various embodiments of the disclosure, the mmWave antenna module 850 may include a plurality of antennas. The plurality of antennas may be arranged in a specific form. The mmWave antenna module 850 may radiate a beam having directivity in a predetermined direction, based on the control of the communication processor 840. The mmWave antenna module 850 may have different amplitudes and phases of signals formed by the plurality of antennas included in the mmWave antenna module 850 to radiate beams having directivity. The communication processor 840 may control the amplitude and phase of a signal formed by each of the plurality of antennas, such that the mmWave antenna module 850 may change the direction of the radiated beam.

According to various embodiments of the disclosure, the mmWave antenna module 850 may be electrically connected to an RFIC 860 (e.g., the fourth RFIC 228 of FIG. 4). The RFIC 860 may be connected between the mmWave antenna module 850 and the communication processor 840. When the communication processor 840 supports a direct conversion scheme, the RFIC 860 may be omitted.

According to various embodiments of the disclosure, the electronic device 800 may include at least one mmWave antenna module 850 to radiate beams in various directions. For example, four mmWave antenna modules 850 may be disposed on a rear surface of the electronic device 800, on a left surface of the electronic device 800, on a right surface of the electronic device 800, and on a lower surface of the electronic device 800, respectively. The number and location of the disposed mmWave antenna modules 850 may be changed according to the designer's intention.

According to various embodiments of the disclosure, the communication processor 840 may establish a communication channel of a band to be used for wireless communication and perform various operations supporting the wireless communication using the established communication channel. The wireless communication may mean communication (e.g., 5G network) supporting beam-forming. The communication processor 840 may control the mmWave antenna module 850 such that the mmWave antenna module 850 radiates a beam having directivity in a specific direction under the control of the application processor 820. The communication processor 840 may control the intensity of the beam radiated by the mmWave antenna module 850 under the control of the application processor 820.

According to various embodiments of the disclosure, the application processor 820 may be operationally connected to the camera 810 and the communication processor 840 to control the communication processor 840 to perform a series of operations to reduce the influence of the beam generated while communicating on the human body.

According to various embodiments of the disclosure, the application processor 820 may identify whether an external object exists around the electronic device 800 and the type of the external object using the camera 810. In response to identifying that the external object is a part of the human body, the application processor 820 may perform a series of operations to reduce the influence of the beam on the human body. In the following, specific operations for reducing the influence of the beam on the human body will be described.

According to various embodiments of the disclosure, the application processor 820 may activate the camera 810 at predetermined periods during communication, and identify whether an external object exists around the electronic device 800 and the type of the external object by using the camera 810.

According to various embodiments of the disclosure, the predetermined period may mean a period of transmitting a frame when performing communication. The predetermined period may mean an interval between frames including transmission data among the plurality of frames.

According to various embodiments of the disclosure, the predetermined period may mean a period that is changed according to the context information collected by the electronic device 800. For example, the electronic device 800 may collect context information about the movement of the electronic device 800 by using an acceleration sensor or a gyroscope sensor included in the electronic device 800. When the movement of the electronic device 800 increases, the electronic device 800 may decrease the predetermined period. The electronic device 800 may increase the predetermined period when the movement of the electronic device 800 decreases.

According to various embodiments of the disclosure, the application processor 820 may analyze images photographed by using the camera 810 and identify whether the external object included in the images is a part of the human body. The application processor 820 may determine not to perform an operation of adjusting the intensity of the signal formed by the mmWave antenna module 550 in response to not identifying that the external object is a part of the human body.

According to various embodiments of the disclosure, the application processor 820 may determine to perform of adjusting the intensity of the signal formed by the mmWave antenna module 550 in response to detecting that the external object is a part of the human body.

According to various embodiments of the disclosure, the application processor 820 may measure the location of the external object and the distance between the external object and the electronic device 800 using the camera 810. The application processor 820 may determine the intensity of the beam to be adjusted based on the distance between the external object and the electronic device 800.

According to various embodiments of the disclosure, the memory 830 may store mapping data in which the beam intensity is mapped according to the distance between the external object and the electronic device 800. The application processor 820 may determine the intensity of the beam to be adjusted based on the mapping data and the distance between the external object and the electronic device 800.

According to various embodiments of the disclosure, the application processor 820 may control the communication processor 840 to output a beam at the determined intensity.

According to various embodiments of the disclosure, the communication processor 840 may reduce the influence of the beam that may be applied to the external object by changing the direction of the beam, based on the information related to the location of the external object transmitted by the application processor 820 and the control of a base station. The electronic device 800 may change the direction of the beam by using a method of determining an area in which beam searching is to be performed, based on the location of the external object and the distance between the external object and the electronic device 800, which is illustrated in FIG. 5.

The electronic device according to various embodiments may include: at least one mmWave antenna module including a plurality of antennas; a camera that can measure a distance between an external object and the electronic device; a communication processor operationally connected to the mmWave antenna module; and an application processor operationally connected to the camera and the communication processor, wherein the application processor may be configured to: identify the communication performance of the mmWave antenna module; determine whether to change a direction of a beam formed by the mmWave antenna module, based on a result of identification of the communication performance; measure a distance between the external object and the electronic device and a location of the external object using the camera; determine an area where beam searching is to be performed from beam coverage, which is an area where a beam formed by the mmWave antenna module can be output, based on the location of the external object and the distance between the external object and the electronic device; control the communication processor to perform beam searching in the determined area; and control the communication processor to change the direction of the beam formed by the mmWave antenna module, based on a result of the beam searching.

In the electronic device according to various embodiments of the disclosure, the application processor may be configured to: compare a range that can be photographed by the camera with a range of a beam that can be output by the antenna module, in response to a determination to change the direction of the beam; and determine whether to activate the camera, based on the comparison result.

In the electronic device according to various embodiments of the disclosure, the application processor may configure an area where beam searching is to be performed, based on a beam book including information on the amplitudes and phases of signals formed by each of the plurality of antennas included in the mmWave antenna module for the mmWave antenna module to output the beam in a specific direction and information on the external object.

In the electronic device according to various embodiments of the disclosure, the application processor may be configured to control the communication processor to perform beam searching for the remaining area except for an area where the external object exists in the area where beam searching is to be performed.

In the electronic device according to various embodiments of the disclosure, the application processor may be configured to control the communication processor to perform beam searching on the area except for the area where the external object disposed below a predetermined distance from the electronic device exists, from the area where the beam searching is to be performed.

In the electronic device according to various embodiments of the disclosure, the application processor may be configured to: compare the size of the area where the external object exists and the size of the beam coverage; and determine whether to change the mmWave antenna module to perform communication, based on the comparison result.

In the electronic device according to various embodiments of the disclosure, the application processor may be configured to determine whether to change the mmWave antenna module to perform communication, based on a relative location of the external object in the image taken by the camera.

In the electronic device according to various embodiments of the disclosure, the application processor may be configured to: identify whether the distance between the external object and the electronic device is less than or equal to a predetermined value; and determine whether to perform an operation of determining an area where beam searching is to be performed, based on the identification result.

In the electronic device according to various embodiments of the disclosure, the application processor may be configured to: identify whether the reception performance decreases below a predetermined value; and control the communication processor to change a direction of a beam formed by the antenna module, in response to identifying that the reception performance decreases below the predetermined value.

In the electronic device according to various embodiments of the disclosure, the application processor may be configured to: identify a type of the external object, based on an image taken by the camera; and control the communication processor to reduce the intensity of a signal formed by the mmWave antenna module or to change the mmWave antenna module to output a signal, based on a result of identifying that the external object is at least a part of a human body.

An electronic device according to various embodiments may include: at least one mmWave antenna module including a plurality of antennas; a camera that can measure a distance between an external object and the electronic device; a communication processor operationally connected to the mmWave antenna module; and an application processor operationally connected to the camera and the communication processor, wherein the application processor may be configured to: activate the camera at a predetermined period; identify whether an external object included in the image is a part of a human body, based on an image taken by the camera; in response to identifying that the external object is a part of the human body, measure a distance between the external object and the electronic device and a location of the external object using the camera; determine an intensity of the beam, based on the distance between the external object and the electronic device; and control the communication processor to output the beam at the determined intensity.

In the electronic device according to various embodiments of the disclosure, the application processor may be configured to: determine a direction in which a beam formed by the mmWave antenna module is to be changed, based on the location of the external object and the distance between the external object and the electronic device; and control the communication processor to output the beam in the direction to be changed.

In the electronic device according to various embodiments of the disclosure, the application processor may be configured to: acquire movement information of the electronic device using an acceleration sensor included in the electronic device; and change the predetermined period, based on the movement information of the electronic device.

Figure 9:
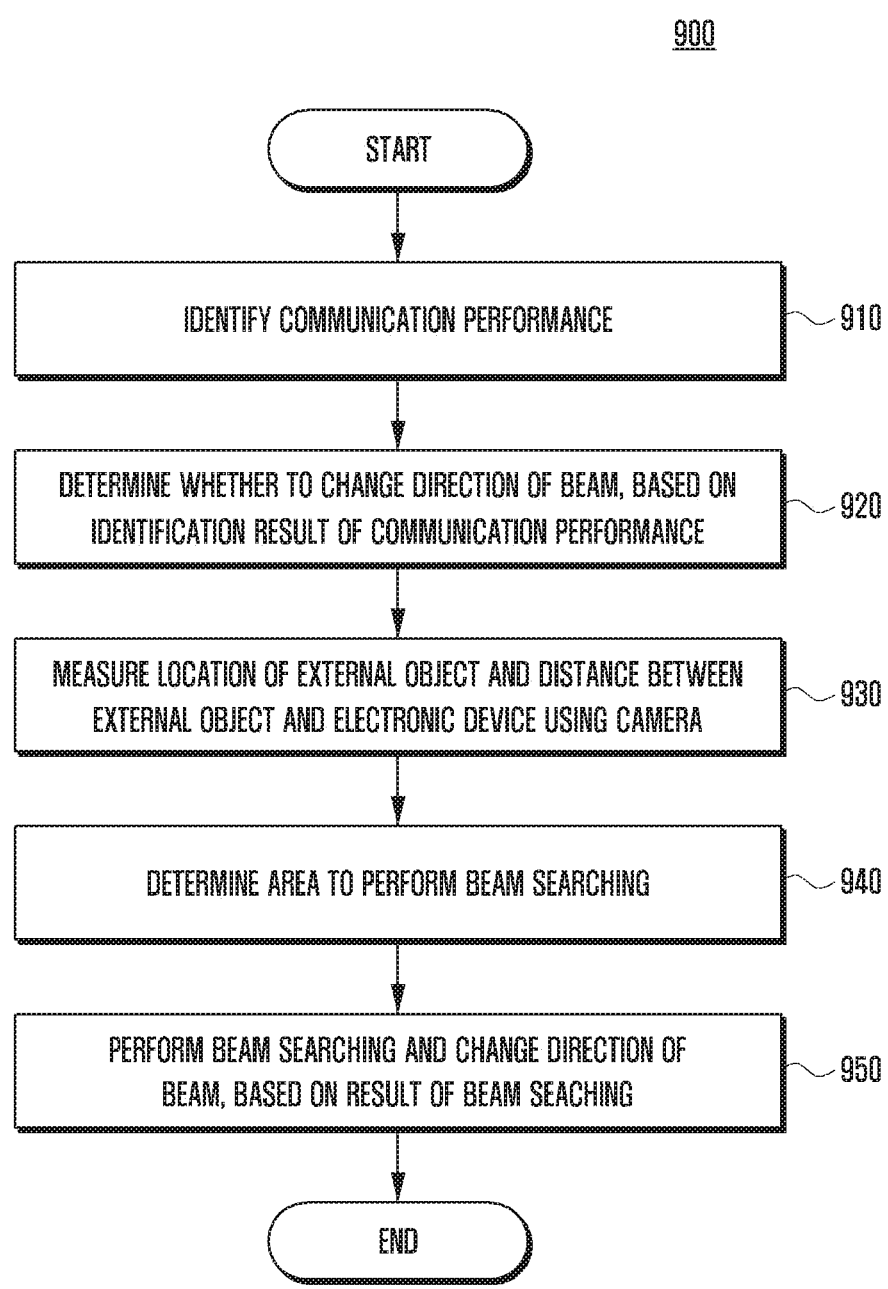
FIG. 9 is an operation flowchart illustrating an operation method of an electronic device according to an embodiment of the disclosure.

FIG. 9 is a flowchart 900 illustrating an operation method of an electronic device according to an embodiment of the disclosure.

Referring to FIG. 9, in the operation method of the electronic device (e.g., the electronic device 500 of FIG. 5), in operation 910, the communication performance (e.g., the quality of a beam radiated for communication or communication performance of the beam) may be identified.

According to various embodiments of the disclosure, the electronic device 500 may identify data related to the communication performance generated by a communication processor 540 while performing communication. The communication performance may mean transmission performance or reception performance of the electronic device 500 and the data related to the communication performance may mean data indicating the communication performance measured in various ways including the block error rate (BLER), signal to noise ratio (SNR) identified by the communication processor 540.

In the operation method of the electronic device 500 according to various embodiments of the disclosure, in operation 920, it may be determined whether to change the direction of the beam, based on a result of identification of the communication performance.

According to various embodiments of the disclosure, the electronic device 500 may determine to change the direction of the beam in response to identifying that the communication performance (e.g., BLER) is equal to or less than a predetermined value. The direction of the beam to be changed may mean a direction in which the communication performance is most increased when the electronic device 500 communicates in the direction of the beam to be changed.

In the operation method of the electronic device 500 according to various embodiments of the disclosure, in operation 930, the location of an external object (e.g., the external object 611 of FIG. 6) and the distance between the external object 611 and the electronic device 500 may be measured using a camera (e.g., the camera 510 of FIG. 5).

According to various embodiments of the disclosure, the camera 510 may be implemented as a time of flight (ToF) camera. The camera 510 may output radio waves (e.g., infrared rays implemented as pulses) in various directions, and may measure the location of the external object and the distance between the external object and the electronic device 500, based on the time when the output radio waves are reflected by the external object and returned.

In the operation method of the electronic device 500 according to various embodiments of the disclosure, in operation 940, an area where beam searching is to be performed may be determined.

According to various embodiments of the disclosure, the electronic device 500 may determine the area where beam searching is to be performed in a beam coverage area, based on the location of the external object and the distance between the external object and the electronic device 500, included in the measurement result. When the distance between the external object and the electronic device 500 is equal to or less than a predetermined value, the electronic device 500 may determine the remaining area except for an area corresponding to the location of the external object as an area where beam searching is to be performed.

In the operation method of the electronic device 500 according to various embodiments of the disclosure, in operation 950, beam searching for the determined area may be performed and the direction of the beam may be changed based on the beam searching result.

According to various embodiments of the disclosure, the electronic device 500 may modify a beam book using the determined area and perform beam searching using the modified beam book. The communication processor 540 may perform beam searching, based on the determined area, and then transmit a beam searching result to a base station.

The communication processor 540 may control an mmWave antenna module 550 to radiate a beam in a direction determined to have the best communication performance, based on the control of the base station.

Figure 10:
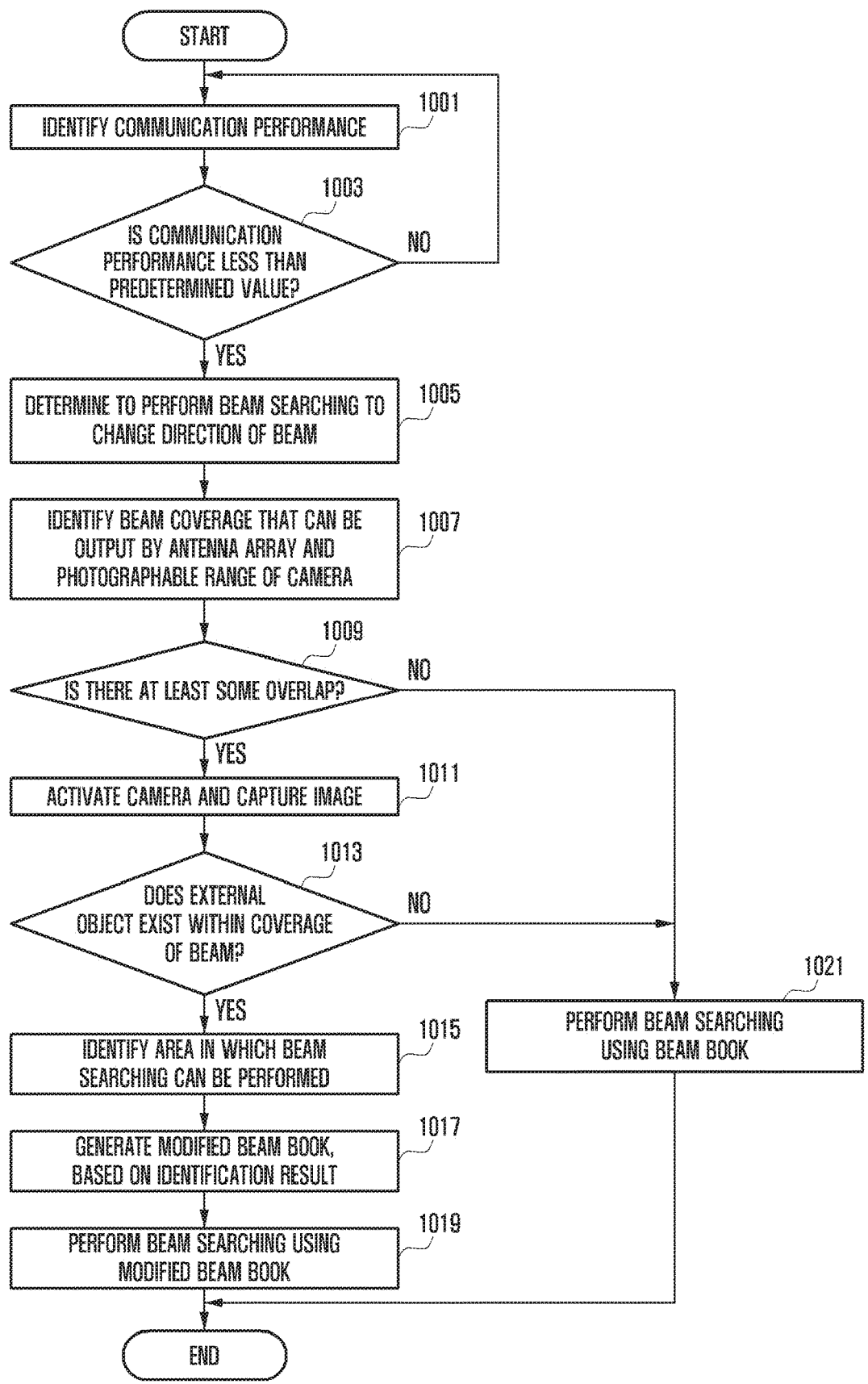
FIG. 10 is an operation flowchart illustrating an operation method of an electronic device according to an embodiment of the disclosure.

FIG. 10 is a flowchart illustrating an operation method of an electronic device according to an embodiment of the disclosure.

Referring to FIG. 10, in the operation method of an electronic device (e.g., the electronic device 500 of FIG. 5) according to various embodiments of the disclosure, in operation 1001, the communication performance may be identified.

According to various embodiments of the disclosure, the electronic device 500 may identify data related to the communication performance generated by a communication processor 540 while performing communication. The communication performance may mean transmission performance or reception performance of the electronic device 500 and the data related to the communication performance may mean data indicating communication performance measured in various ways including the block error rate (BLER), signal to noise ratio (SNR) identified by the communication processor 540.

In the operation method of the electronic device 500 according to various embodiments of the disclosure, in operation 1003, it may be identified whether the communication performance is less than or equal to a predetermined value. In the operation method of the electronic device 500, in operation 1005, in response to identifying that the communication performance is equal to or less than the predetermined value, it may be determined to perform beam searching to change the direction of the beam.

According to various embodiments of the disclosure, the electronic device 500 may determine to change the direction of the beam in response to identifying that the communication performance (e.g., BLER) is equal to or less than the predetermined value. The direction of the beam to be changed may mean a direction in which the communication performance is most increased when the electronic device 500 communicates in the direction of the beam to be changed. In order to change the direction of the beam, the electronic device 500 may perform beam searching, which is an operation for identifying the direction of the beam having the highest communication performance.

In the operation method of the electronic device 500 according to various embodiments of the disclosure, in operation 1007, the beam coverage, which means the range of beams that can be output by an mmWave antenna module (e.g., the mmWave antenna module 550 of FIG. 5) and a range in which the camera (e.g., camera 510 of FIG. 5) can photograph, may be identified.

According to various embodiments of the disclosure, the range in which the camera 510 can photograph (e.g., 610 of FIG. 6) may mean an angle of view of the camera 510, and the range in which the camera 510 can photograph may be previously stored in a memory 530. The beam coverage may mean the range of beams in which the mmWave antenna module 550 can output (e.g., 620 of FIG. 6) and may be previously stored in the memory 530.

In the operation method of the electronic device 500 according to various embodiments of the disclosure, in operation 1009, it may be identified whether at least parts of the beam coverage 620 and the range in which the camera 610 can photograph overlap.

According to various embodiments of the disclosure, the electronic device 500 may perform the operation illustrated in operation 1021 in response to identifying that the beam coverage and the range in which the camera can photograph do not overlap.

In the operation method of the electronic device 500 according to various embodiments of the disclosure, in operation 1011, the camera 510 may be activated and may photograph a depth image in response to identifying that the beam coverage and the range in which the camera can photograph overlap in part.

According to various embodiments of the disclosure, the depth image may be an image including relative distance information between an object corresponding to pixels included in the photographed image and the electronic device 500. The electronic device 500 may photograph the depth image and determine whether an external object exists, based on a result of analyzing the depth image.

According to various embodiments of the disclosure, when at least portions of the range in which the camera 510 can photograph and the beam coverage of the mmWave antenna module 550 overlap, the electronic device 500 may activate the camera 510 and control the camera 510 in order to identify whether an external object exists around the electronic device 500.

In the operation method of the electronic device 500 according to various embodiments of the disclosure, in operation 1013, it may be identified whether an external object (e.g., the external object 611 of FIG. 6) exists in the beam coverage.

According to various embodiments of the disclosure, the electronic device 500 may perform the operation illustrated in operation 1021 in response to identifying that the external object does not exist in the beam coverage.

In the operation method of the electronic device 500 according to various embodiments of the disclosure, in operation 1015, an area in which beam searching can be performed may be identified.

According to various embodiments of the disclosure, the electronic device 500 may identify that the external object 611 exists in the beam coverage and identify an area in which beam searching can be performed. The area in which beam searching can be performed may mean the remaining area 621 except for an area 623 corresponding to the external object 611 in the beam coverage (e.g., the beam coverage 620 of FIG. 6).

In the operation method of the electronic device 500 according to various embodiments of the disclosure, in operation 1017, a modified beam book may be generated based on the result identified in operation 1015.

According to various embodiments of the disclosure, the beam book 701 may be modified in such a manner as to exclude indexes corresponding to the area corresponding to the location of the external object 611 among the plurality of indexes included in the beam book 701 before the modification, and a modified beam book 711 may be generated.

In the operation method of the electronic device 500 according to various embodiments of the disclosure, in operation 1019, beam searching may be performed using the modified beam book.

When the electronic device 500 performs beam searching using the beam book before modification illustrated in FIG. 7A, beam searching may be performed in 64 directions. When the electronic device 500 performs beam searching using the modified beam book illustrated in FIG. 7B, beam searching may be performed in only 42 directions without performing beam searching in 21 directions. Therefore, the electronic device 500 according to various embodiments may acquire a fast searching speed.

In the operation method of the electronic device 500 according to various embodiments of the disclosure, in operation 1021, beam searching may be performed using the beam book. The beam book used to perform beam searching in operation 1021 may mean the unmodified beam book (e.g., the beam book 701 of FIG. 7A).

Figure 11:
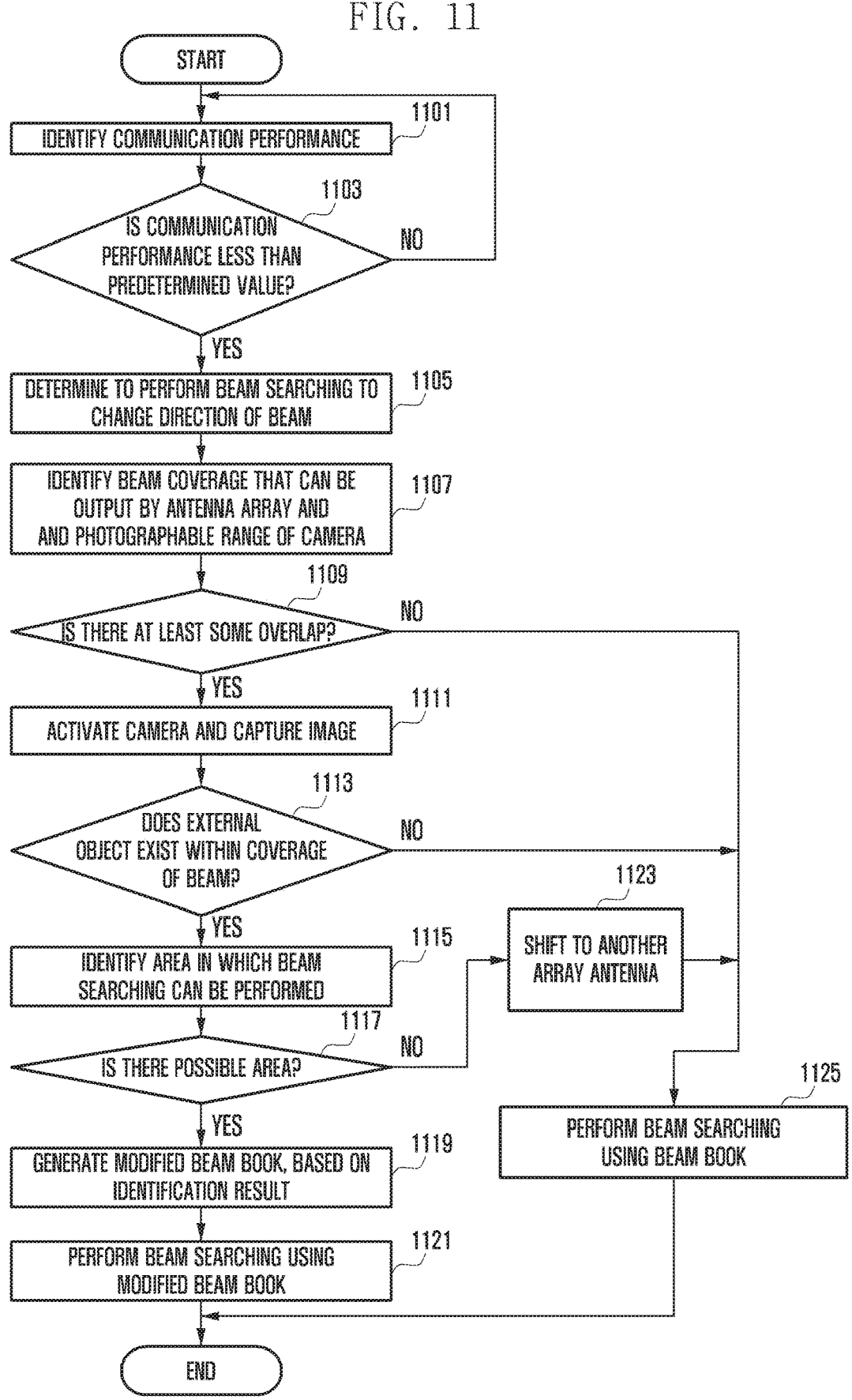
FIG. 11 is an operation flowchart illustrating an operation method of an electronic device according to an embodiment of the disclosure.

FIG. 11 is a flowchart illustrating an operation method of an electronic device according to an embodiment of the disclosure.

Referring to FIG. 11, in the operation method of an electronic device (e.g., the electronic device 500 of FIG. 5) according to various embodiments of the disclosure, in operation 1101, the communication performance may be identified.

According to various embodiments of the disclosure, the electronic device 500 may identify data related to the communication performance generated by a communication processor 540 while performing communication. The communication performance may mean transmission performance or reception performance of the electronic device 500 and the data related to the communication performance may mean data indicating the communication performance measured in various ways including the block error rate (BLER), signal to noise ratio (SNR) identified by the communication processor 540.

In the operation method of the electronic device 500 according to various embodiments of the disclosure, in operation 1103, it may be identified whether the communication performance is less than or equal to a predetermined value. In the operation method of the electronic device 500, in operation 1105, in response to identifying that the communication performance is equal to or less than the predetermined value, it may be determined to perform beam searching to change the direction of the beam.

According to various embodiments of the disclosure, the electronic device 500 may determine to change the direction of the beam in response to identifying that the communication performance (e.g., BLER) is equal to or less than the predetermined value. The direction of the beam to be changed may mean a direction in which the communication performance is most increased when the electronic device 500 communicates in the direction of the beam to be changed. In order to change the direction of the beam, the electronic device 500 may perform beam searching, which is an operation for identifying the direction of the beam having the highest communication performance.

In the operation method of the electronic device 500 according to various embodiments of the disclosure, in operation 1107, the beam coverage, which means the range of beams that can be output by an mmWave antenna module (e.g., the mmWave antenna module 550 of FIG. 5) and a range in which a camera (e.g., camera 510 of FIG. 5) can photograph may be identified.

According to various embodiments of the disclosure, the range in which the camera 510 can photograph (e.g., 610 of FIG. 6) may mean an angle of view of the camera 510, and the range in which the camera 510 can photograph may be previously stored in a memory 530. The beam coverage may mean the range of beams that mmWave antenna module 550 can output (e.g., 620 of FIG. 6) and may be previously stored in the memory 530.

In the operation method of the electronic device 500 according to various embodiments of the disclosure, in operation 1109, it may be identified whether at least parts of the beam coverage 620 and the range in which the camera 610 can photograph overlap.

According to various embodiments of the disclosure, the electronic device 500 may perform the operation illustrated in operation 1121 in response to identifying that the beam coverage and the range in which the camera can photograph do not overlap.

In the operation method of the electronic device 500 according to various embodiments of the disclosure, in operation 1111, the camera 510 may be activated and may photograph an image in response to identifying that the beam coverage and the range in which the camera 510 can photograph overlap in part.

According to various embodiments of the disclosure, when at least portions of the range in which the camera 510 can photograph and the beam coverage of the mmWave antenna module 550 overlap, the electronic device 500 may activate the camera 510 and may control the camera 510 in order to identify whether an external object exists around the electronic device 500.

In the operation method of the electronic device 500 according to various embodiments of the disclosure, in operation 1113, it may be identified whether an external object (e.g., the external object 611 of FIG. 6) exists in the beam coverage.

According to various embodiments of the disclosure, the electronic device 500 may perform the operation illustrated in operation 1125 in response to identifying that the external object does not exist in the beam coverage.

In the operation method of the electronic device 500 according to various embodiments of the disclosure, in operation 1115, an area in which beam searching can be performed may be identified.

According to various embodiments of the disclosure, the electronic device 500 may identify that the external object 611 exists in the beam coverage and identify an area in which beam searching can be performed. The area in which beam searching can be performed may mean the remaining area 621 except for an area 623 corresponding to the external object 611 in the beam coverage (e.g., the beam coverage 620 of FIG. 6).

In the operation method of the electronic device 500 according to various embodiments of the disclosure, in operation 1117, it may be identified whether an area in which beam searching can be performed exists.

According to various embodiments of the disclosure, when the size of the area where the external object 611 exists occupies a certain portion or more in the coverage 610 of the beam, it may be difficult to improve the communication performance even if the beam direction is changed. The electronic device 500 may determine that there is no beam searchable area when the area where the external object 611 exists occupies a predetermined portion or more in the coverage 610 of the beam.

According to various embodiments of the disclosure, the electronic device 500 may determine whether a beam searchable area exists based on the relative location of the external object included in the image photographed by the camera 510. The image photographed by the camera 510 may be an image including relative distance information between an object corresponding to pixels included in the photographed image and the electronic device 500. The electronic device 500 may photograph a depth image and identify the existence of an external object and the distance between the external object and the electronic device 500.

The electronic device 500 may identify the ratio of the external object in the upper region of the image, and may identify whether the ratio in the upper region is greater than or equal to a predetermined value. When the external object exists in the upper region, the communication performance may be reduced while the beam radiated for communication with a base station is reflected by the external object. The electronic device 500 may determine that the area in which beam searching can be performed does not exist, in response to identifying that the ratio of the external object to the upper region is greater than or equal to the predetermined value, and in operation 1123, may change the mmWave antenna module 550 to perform communication.

In the operation method of the electronic device 500 according to various embodiments of the disclosure, in operation 1119, in response to identifying whether an area in which beam searching can be performed exists in operation 1115, a modified beam book may be generated.

According to various embodiments of the disclosure, the beam book 701 may be modified in such a manner as to exclude indexes corresponding to the area corresponding to the location of the external object 611 among the plurality of indexes included in the beam book 701 before modification, and the modified beam book 711 may be generated.

In the operation method of the electronic device 500 according to various embodiments of the disclosure, in operation 1121, beam searching may be performed using the modified beam book.

When the electronic device 500 performs beam searching using the beam book before modification illustrated in FIG. 7A, beam searching may be performed in 64 directions. When the electronic device 500 performs beam searching using the modified beam book illustrated in FIG. 7B, beam searching may be performed in only 42 directions without performing beam searching in 21 directions. Therefore, the electronic device 500 according to various embodiments may acquire a fast searching speed.

In the operation method of the electronic device 500 according to various embodiments of the disclosure, in operation 1117, in response to identifying that the area in which beam searching can be performed does not exist, the mmWave antenna module may be switched to another mmWave antenna module (e.g., the second mmWave antenna module 550-*b* of FIG. 6).

According to various embodiments of the disclosure, the electronic device 500 may switch to another array antenna to improve the communication performance.

In the operation method of the electronic device 500 according to various embodiments of the disclosure, in operation 1125, beam searching may be performed using the beam book. The beam book used to perform beam searching in operation 1125 may mean an unmodified beam book (e.g., the beam book 701 of FIG. 7A).

Figure 12:
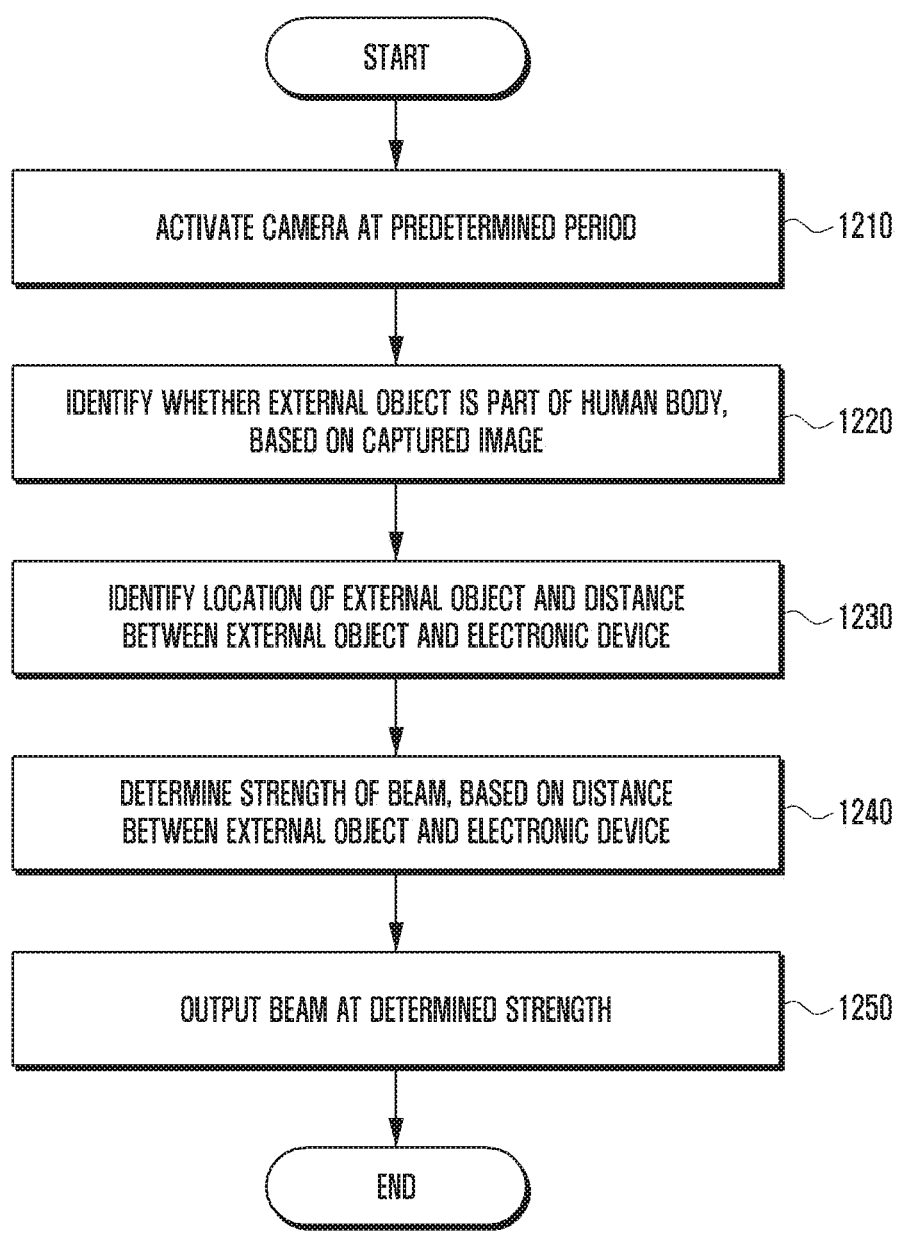
FIG. 12 is an operation flowchart illustrating an operation method of an electronic device according to an embodiment of the disclosure.

FIG. 12 is a flowchart illustrating an operation method of an electronic device according to an embodiment of the disclosure.

Referring to FIG. 12, in the operation method of the electronic device (e.g., the electronic device 800 of FIG. 8) according to various embodiments of the disclosure, in operation 1210, a camera (e.g., the camera 810 of FIG. 8) may be activated at a predetermined period.

According to various embodiments of the disclosure, the electronic device 800 may photograph an external object around the electronic device 800 using the activated camera 810.

According to various embodiments of the disclosure, the predetermined period may mean a period of transmitting frames when performing communication. The predetermined period may mean an interval between frames including transmission data among the plurality of frames.

According to another embodiment of the disclosure, the predetermined period may mean a period changed depending on context information collected by the electronic device 800. For example, the electronic device 800 may collect context information about the movement of the electronic device 800 by using an acceleration sensor or a gyroscope sensor included in the electronic device 800. When the movement of the electronic device 800 increases, the electronic device 800 may decrease the predetermined period. When the movement of the electronic device 800 decreases, the electronic device 800 may increase the predetermined period.

In the operation method of the electronic device 800 according to various embodiments of the disclosure, in operation 1220, the photographed image may be analyzed and it may be identified whether the photographed external object is a part of the human body.

According to various embodiments of the disclosure, the electronic device 800 may analyze the image photographed by the camera 810 and may identify whether the external object included in the image is a part of the human body. The electronic device 800 may determine not to perform an operation of adjusting the intensity of the signal formed by the mmWave antenna module 550, in response to failing to identify that the external object is a part of the human body.

According to various embodiments of the disclosure, the electronic device 800 may determine to perform an operation of adjusting the intensity of the signal formed by the mmWave antenna module 550, in response to identifying that the external object is a part of the human body.

In the operation method of the electronic device 800 according to various embodiments of the disclosure, in operation 1230, the location of the external object and the distance between the external object and the electronic device 800 may be identified.

According to various embodiments of the disclosure, the electronic device 800 may measure the location of the external object and the distance between the external object and the electronic device 800 using the camera 810.

In the operation method of the electronic device 800 according to various embodiments of the disclosure, in operation 1240, the intensity of the beam may be determined based on the distance between the external object and the electronic device 800.

According to various embodiments of the disclosure, the electronic device 800 may include a memory 830 in which mapping data in which intensity of a beam is mapped depending on the distance between the external object and the electronic device 800 is stored. The electronic device 800 may determine the intensity of the beam to be adjusted, based on the mapping data stored in the memory 830 and the distance between the external object and the electronic device 800.

In the operation method of the electronic device 800 according to various embodiments of the disclosure, in operation 1250, a beam may be output at the determined intensity.

Figure 13:
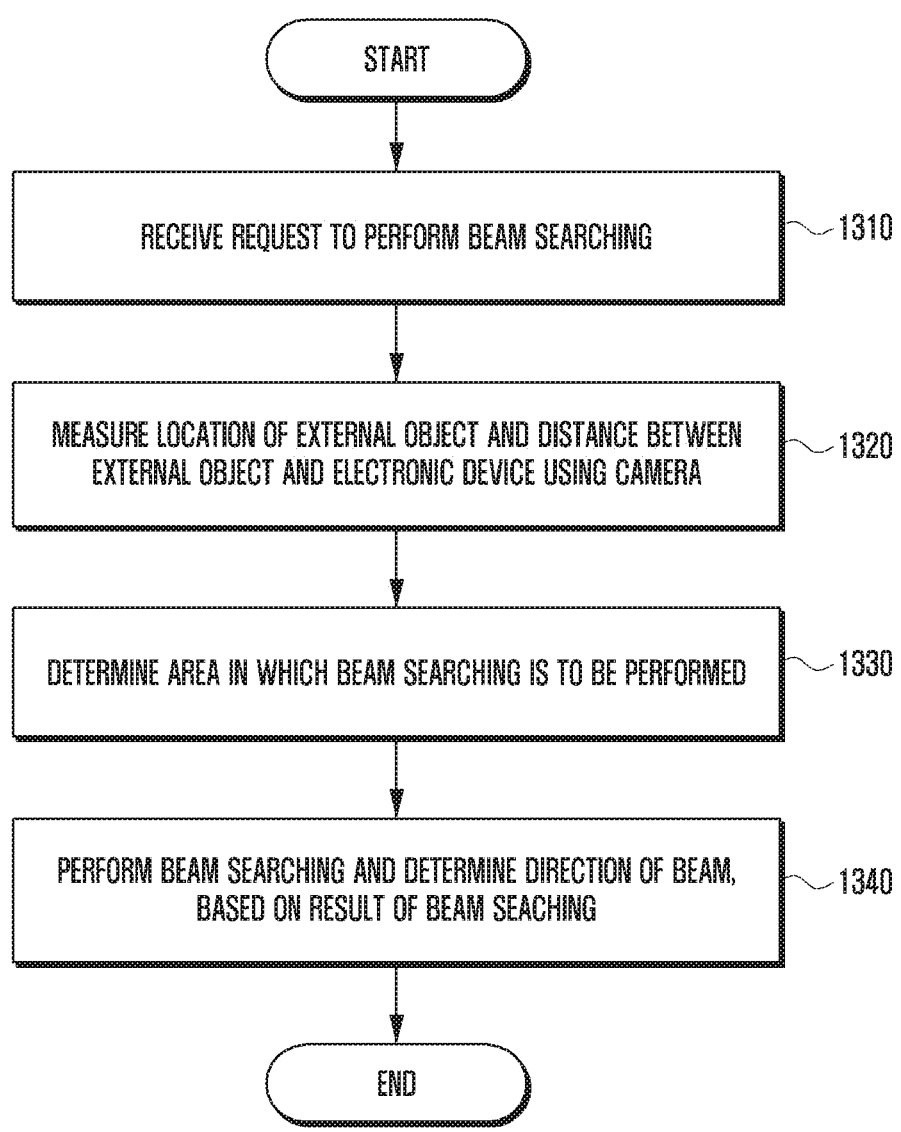
FIG. 13 is an operation flowchart illustrating an operation method of an electronic device according to an embodiment of the disclosure.

FIG. 13 is a flowchart illustrating an operation method of an electronic device according to an embodiment of the disclosure.

Referring to FIG. 13, in the operation method of the electronic device (e.g., the electronic device 500 of FIG. 5) according to various embodiments of the disclosure, in operation 1310, a communication processor (e.g., the communication processor 540 of FIG. 5) may receive a beam searching execution request.

According to various embodiments of the disclosure, an application processor (e.g., the application processor 520 of FIG. 5) may request the communication processor 540 to perform beam searching in order to perform communication with a base station.

In the operation method of the electronic device 500 according to various embodiments of the disclosure, in operation 1320, a location of an external object (e.g., the external object 611 of FIG. 6) and a distance between the external object 611 and the electronic device 500 may be measured using a camera (e.g., the camera 510 of FIG. 5).

According to various embodiments of the disclosure, the camera 510 may be implemented as a time of flight (FoT) camera. The camera 510 may output radio waves (e.g., infrared rays implemented in the form of pulses) in various directions and the location of the external object and the distance between the external object and the electronic device 500 may be measured based on the time when the output radio waves are reflected by the external object and returned.

In the operation method of the electronic device 500 according to various embodiments of the disclosure, in operation 1330, an area in which beam searching is to be performed may be determined.

According to various embodiments of the disclosure, the electronic device 500 may determine an area where beam searching is to be performed in the beam coverage area, based on the location of the external object and the distance between the external object and the electronic device 500 included in the measurement result. When the distance between the external object and the electronic device 500 is less than or equal to a predetermined value, the electronic device 500 may determine the remaining area except for an area corresponding to the location of the external object as an area where beam searching is to be performed in the beam coverage.

In the operation method of the electronic device 500 according to various embodiments of the disclosure, in operation 1340, beam searching may be performed on the determined area, and the direction of the beam may be determined based on a result of performing beam searching.

According to various embodiments of the disclosure, the electronic device 500 may modify a beam book using the determined area, and perform beam searching using the modified beam book. The communication processor 540 may perform beam searching, based on the determined area, and then may transmit a beam searching result to a base station. The communication processor 540 may control the mmWave antenna module 550 to radiate a beam in a direction identified to have the best communication performance, based on the control of the base station.

An operation method of an electronic device according to various embodiments may include: identifying, by a communication processor, communication performance of at least one mmWave antenna module including a plurality of antennas; determining, by the communication processor, whether to change a direction of a beam formed by the mmWave antenna module, based on a result of the identification of communication performance; measuring, by an application processor, a distance between an external object and the electronic device and a location of the external object using a camera that can measure the distance between the external object and the electronic device, in response to determination to change the direction of the beam; determining, by the application processor, an area where beam searching is to be performed from beam coverage, an area in which a beam formed by the mmWave antenna module can be outputted, based on the location of the external object and the distance between the external object and the electronic device; and performing, by the communication processor, beam searching with reference to the determined area.

The operation method of an electronic device according to various embodiments may further include: comparing, by the application processor, the range in which the camera can photograph with a range in which the antenna module can output the beam, in response to determination to change the direction of the beam; and determining, by the application processor, whether to activate the camera, based on a comparison result.

In the operation method of an electronic device according to various embodiments of the disclosure, the determining the area in which beam searching is to be performed may include determining, by the application processor, an area in which beam searching is to be performed, based on a beam book including information on the amplitude and phase of a signal formed by each of the plurality of antennas included in the mmWave antenna module, for the mmWave antenna module to output the beam in a specific direction and information on the external object.

In the operation method of an electronic device according to various embodiments of the disclosure, the performing beam searching may include performing, by the communication processor, beam searching on the remaining area except for an area in which the external object disposed below a predetermined distance from the electronic device exists in the area where the beam searching is to be performed.

In the operation method of an electronic device according to various embodiments of the disclosure, the determining the area in which beam searching is to be performed may include: identifying, by the application processor, whether the distance between the external object and the electronic device is less than or equal to a predetermined value; and determining, by the application processor, whether to perform the operation of determining the area in which beam searching is to be performed, based on the identification result.

In the operation method of an electronic device according to various embodiments of the disclosure, the determining whether to change the direction of the beam may include: identifying, by the communication processor, whether the reception performance decreases below a predetermined value; and determining, by the communication processor, to change the direction of a beam formed by the mmWave antenna module, in response to identifying whether the reception performance decreases below the predetermined value.

The operation method of an electronic device according to various embodiments may further include: identifying a type of the external object, based on an image taken by the camera; and reducing an intensity of a signal formed by the mmWave antenna module or changing the mmWave antenna module to output a signal, based on a result of identifying that the external object is at least a part of a human body.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one mmWave antenna array configured to include a plurality of antennas;
a camera capable of measuring a distance between an external object and the electronic device;
a communication processor configured to be operationally connected to the at least one mmWave antenna array; and
an application processor configured to be operationally connected to the camera and the communication processor,
wherein the application processor is further configured to:
identify a communication performance of the at least one mmWave antenna array;
determine whether to change a direction of a beam formed by the at least one mmWave antenna array, based on a result of identification of the communication performance;
measure a distance between the external object and the electronic device and a location of the external object using the camera;
determine an area where beam searching is to be performed from beam coverage, which is an area where the at least one mmWave antenna array can output a beam, based on the location of the external object and the distance between the external object and the electronic device;
control the communication processor to perform the beam searching in the determined area; and
control the communication processor to change the direction of the beam formed by the at least one mmWave antenna array, based on a result of the beam searching.

2. The electronic device of claim 1, wherein the application processor is further configured to:
compare a range that can be photographed by the camera with a range of beam that can be output by the at least one mmWave antenna array, in response to the determination to change the direction of the beam; and
determine whether to activate the camera based on a result of the comparison.

3. The electronic device of claim 1, wherein the application processor is further configured to configure an area where the beam searching is to be performed, based on a beam book including information on an amplitude and phase of a signal formed by each of the plurality of antennas included in the at least one mmWave antenna array, for the at least one mmWave antenna array to output the beam in a specific direction and information on the external object.

4. The electronic device of claim 1, wherein the application processor is further configured to control the communication processor to perform the beam searching for a remaining area except for an area where the external object exists in the area in which the beam searching is to be performed.

5. The electronic device of claim 1, wherein the application processor is further configured to control the communication processor to perform the beam searching for a remaining area except for an area in which the external object disposed below a predetermined distance from the electronic device exists in the area where the beam searching is to be performed.

6. The electronic device of claim 1, wherein the application processor is further configured to:
compare a size of the area where the external object exists and a size of the beam coverage, and
determine whether to change the at least one mmWave antenna array to perform communication, based on a result of the comparison.

7. The electronic device of claim 1, wherein the application processor is further configured to determine whether to change the at least one mmWave antenna array to perform communication, based on a relative location of the external object in an image taken by the camera.

8. The electronic device of claim 1, wherein the application processor is further configured to:
identify whether the distance between the external object and the electronic device is less than or equal to a predetermined value, and
determine whether to perform an operation of determining an area where the beam searching is to be performed, based on an identification result.

9. The electronic device of claim 1, wherein the application processor is further configured to:
identify whether reception performance decreases below a predetermined value, and
control the communication processor to change a direction of a beam formed by the at least one mmWave antenna array, in response to identifying that the reception performance decreases below the predetermined value.

10. The electronic device of claim 1, wherein the application processor is further configured to:
identify a type of the external object, based on an image taken by the camera, and
control the communication processor to reduce an intensity of a signal formed by the at least one mmWave antenna array or to change the at least one mmWave antenna array to output a signal, based on a result of identification that the external object is at least part of a human body.

11. An electronic device comprising:
at least one mmWave antenna array configured to include a plurality of antennas;
a camera capable of measuring a distance between an external object and the electronic device;
a communication processor configured to be operationally connected to the at least one mmWave antenna array; and
an application processor configured to be operationally connected to the camera and the communication processor,
wherein the application processor is further configured to:
activate the camera at a predetermined period;
based on an image taken by the camera, identify whether an external object included in the image is a part of a human body;
in response to identification that the external object is a part of the human body, measure a distance between the external object and the electronic device and a location of the external object using the camera;
determine an intensity of a beam formed by the at least one mmWave antenna array, based on the distance between the external object and the electronic device; and
control the communication processor to output the beam at the determined intensity.

12. The electronic device of claim 11, wherein the application processor is further configured to:
determine a direction in which the beam formed by the at least one mmWave antenna array is to be changed, based on the location of the external object and the distance between the external object and the electronic device, and
control the communication processor to output the beam in the direction to be changed.

13. The electronic device of claim 11, wherein the application processor is further configured to:
acquire movement information of the electronic device using an acceleration sensor included in the electronic device, and
change the predetermined period, based on the movement information of the electronic device.

14. A method of an electronic device, the method comprising:
identifying, by a communication processor, communication performance of at least one mmWave antenna array including a plurality of antennas;
determining, by the communication processor, whether to change a direction of a beam formed by the at least one mmWave antenna array, based on a result of identification of communication performance;
measuring, by an application processor, a distance between an external object and the electronic device and a location of the external object using a camera capable of measuring the distance between the external object and the electronic device, in response to a determination to change the direction of the beam;
determining, by the application processor, an area where beam searching is to be performed from beam coverage, an area where a beam formed by the at least one mmWave antenna array can be outputted, based on the location of the external object and the distance between the external object and the electronic device; and
performing, by the communication processor, the beam searching with reference to the determined area.

15. The method of claim 14, further comprising:
comparing, by the application processor, a range in which the camera can photograph with a range in which the at least one mmWave antenna array can output the beam, in response to a determination to change the direction of the beam; and
determining, by the application processor, whether to activate the camera, based on a comparison result.

16. The method of claim 14, wherein the determining of the area in which the beam searching is to be performed comprises determining, by the application processor, an area where the beam searching is to be performed, based on a beam book including information on an amplitude and phase of a signal formed by each of the plurality of antennas included in the at least one mmWave antenna array, for the at least one mmWave antenna array to output the beam in a specific direction and information on the external object.

17. The method of claim 14, wherein the performing of the beam searching comprises performing, by the communication processor, the beam searching on a remaining area except for an area where the external object disposed below a predetermined distance from the electronic device exists in the area where the beam searching is to be performed.

18. The method of claim 14, wherein the determining of the area in which the beam searching is to be performed comprises:
- identifying, by the application processor, whether the distance between the external object and the electronic device is less than or equal to a predetermined value; and
- determining, by the application processor, whether to perform the operation of determining the area where the beam searching is to be performed, based on a result of the identification.

19. The method of claim 14, wherein the determining of whether to change the direction of the beam comprises:
- identifying, by the communication processor, whether reception performance decreases below a predetermined value; and
- determining, by the communication processor, to change the direction of a beam formed by the at least one mmWave antenna array, in response to identifying whether the reception performance decreases below the predetermined value.

20. The method of claim 14, further comprising:
- identifying a type of the external object, based on an image taken by the camera; and
- reducing an intensity of a signal formed by the at least one mmWave antenna array or changing the at least one mmWave antenna array to output a signal, based on a result of identification that the external object is at least a part of a human body.

\* \* \* \* \*